(12) United States Patent
Wiggins et al.

(10) Patent No.: US 12,506,785 B2
(45) Date of Patent: Dec. 23, 2025

(54) DETECTING VIOLATIONS OF DATA POLICIES VIA DYNAMIC CLASSIFICATION OF DIGITAL DATA OBJECTS

(71) Applicant: OneTrust LLC, Atlanta, GA (US)

(72) Inventors: Shane Wiggins, Atlanta, GA (US); Aniruddha Ghosal, Sandy Springs, GA (US); Akshay Kumar, New York, NY (US); Sivanandame Chandramohan, Atlanta, GA (US); Kevin Jones, Atlanta, GA (US)

(73) Assignee: OneTrust, LLC, Atlanta, GA (US)

( * ) Notice: Subject to any disclaimer, the term of this patent is extended or adjusted under 35 U.S.C. 154(b) by 78 days.

(21) Appl. No.: 18/485,015

(22) Filed: Oct. 11, 2023

(65) Prior Publication Data

US 2025/0126152 A1   Apr. 17, 2025

(51) Int. Cl.
*H04L 9/40* (2022.01)
*G06F 16/28* (2019.01)

(52) U.S. Cl.
CPC ............ *H04L 63/20* (2013.01); *G06F 16/285* (2019.01)

(58) Field of Classification Search
None
See application file for complete search history.

(56) References Cited

U.S. PATENT DOCUMENTS

2024/0056486 A1* 2/2024 Lowenhardt ............ H04L 41/16

* cited by examiner

*Primary Examiner* — Cai Y Chen
(74) *Attorney, Agent, or Firm* — Ballard Spahr LLP

(57) ABSTRACT

Methods, systems, and non-transitory computer readable storage media are disclosed for managing computing systems to classify and modify digital content items to satisfy digital data requirements of data policies. For example, the content classification system validates, enforces, and remediates digital data content corresponding to digital data requirements of a data policy based on data types covered by the data policy. The disclosed systems generate classifications for digital content items by accessing digital content items and generating mappings between the digital content items and a data policy. The disclosed systems utilize the mappings and digital data requirements of the data policy to determine whether the digital content items violate one or more elements of the data policy. The disclosed systems can perform various downstream operations to remediate the data policy violations, such as by causing various computing devices to modify the violating digital content items.

20 Claims, 17 Drawing Sheets

Data Retention

Jurisdiction ▶

Search...

☐ Select All
☐ Europe
☐ South America
☐ Middle East
☐ United States
☑ California
     ↳ 710

Category [Employment] ▶
Data Policy [All] ▶

Employment Medical Records

☑ Doctors Notes
☑ Medical Reports
☐ Accommodations

Employment Payroll

☐ Doctors Notes
☑ Medical Reports
☐ Accommodations

*Fig. 7*

Violations
Issues > Violations

| Name Of Issue | Organization | Type | Severity Level | Data Source | Stage | Deadline |
|---|---|---|---|---|---|---|
| S3 Bucket with Public Access | R&D | Data Access | High | Source 1 | Investigating | 02/03/2023 12:00 AM |
| Data Retention Storage Period Expired | R&D | Data Retention | Moderate | Source 2 | Identified | 02/24/2023 12:00 AM |
| Employee Resume Storage Period Expired | R&D | Data Retention | Low | Source 3 | Restored | 01/27/2023 12:00 AM |
| Passwords Detected in enterprise OneDrive | R&D | Data Usage | Moderate | Source 4 | Remediating | 01/27/2023 12:00 AM |
| User Consent Data Expired | R&D | Data Retention | Moderate | Source 5 | Requires Action | 04/07/2023 12:00 AM |

*Fig. 13*

DETECTING VIOLATIONS OF DATA POLICIES VIA DYNAMIC CLASSIFICATION OF DIGITAL DATA OBJECTS

BACKGROUND

Advances in computer processing and data storage technologies have led to a significant increase in the amount and types of data moved to digital environments for processing and management. Specifically, many entities utilize computing devices to store, analyze, transmit, and/or perform a number of computing operations on different types of data in connection with various data processes. Computing systems handling (e.g., collecting, receiving, transmitting, storing, processing, sharing, and/or the like) certain types of digital data are often subject to requirements for handling such data (e.g., internally for an entity or externally via one or more regulatory bodies). More specifically, many data processes for handling data (e.g., personally identifiable information) are subject to various laws, regulations, and industry standards that include requirements for handling such types of data in specific ways (e.g., via certain computing processes, limitations, or capabilities) for security and privacy reasons. Additionally, downstream operations involving specific data types can also include various requirements for identifying, locating, scanning, classifying, or otherwise handling the specific data types.

This surge in data usage has introduced complex challenges for large organizations, particularly concerning data sprawl, attack surface expansion, and issues related to data retention policies, all of which pose significant risks to data security and privacy. Data sprawl, in this context, pertains to the proliferation of independent software applications that handle and store data, including sensitive or personal information. This proliferation makes it challenging to monitor the locations and usage of data, thereby elevating the risk of data breaches and security incidents. Data sprawl, in this context, pertains to the proliferation of independent software applications that handle and store data, including sensitive or personal information. This proliferation makes it challenging to monitor the locations and usage of data, thereby elevating the risk of data breaches and security incidents.

In addition to data sprawl and attack surface concerns, organizations face the challenge of managing data in compliance with retention policies. For instance, situations may arise where data, such as a job applicant's resume, is retained longer than allowed after a candidate has been rejected. This failure to adhere to data retention policies not only poses legal and regulatory risks but also increases the potential for data breaches and compliance violations. Issues such as sensitive data ending up in unintended locations and data being accessed or used inappropriately further compound these challenges. In another example, many systems require that financial data associated with payment cards be handled according to the Payment Card Industry Data Security Standard ("PCI DSS"), which specifies twelve different requirements for compliance with a set of standards or regulations for protecting cardholder data. Accordingly, computing systems that are involved in handling such financial data are required to implement and enforce specific digital data requirements, such as that include data asset structures, applications, or communications methods to be in compliance with the PCI DSS. As highlighted by these examples, software solutions for managing data generated and used by a large number of different systems and applications lack features for addressing one or more of these issues with respect to sensitive information, unauthorized access and misuse could result in data compromise or loss.

Due to the variety of requirements for different types of digital data, locating and managing digital content to accommodate the varied digital data requirements within computing systems can be a challenging task. In particular, due to the complexity and extent of many large scale computing systems (e.g., in a credit card processing system), digital data repositories including digital content items for various data processes may include a large number of individual digital content items. Further, entities may need to account for digital data requirements based on a variety of data assets (e.g., servers, storage devices, software applications) and data processes (e.g., transferring data between data assets, storing data in a data asset, interfacing with external systems, or other downstream operations involving digital content items).

Additionally, large scale computing systems can often include data assets and data processing activities in different locations/jurisdictions, thus invoking different applicable data policies that each may include the same or different digital data requirements. Implementing such computing systems with the various requirements can add significant technical challenges when preparing digital data for the downstream operations. Furthermore, as data policies, computing systems, and data change over time, adapting computing systems corresponding to the data processes can introduce additional technical challenges.

SUMMARY

This disclosure describes various aspects for determining whether stored digital data conforms with digital data requirements of various data policies. In particular, the disclosed systems access a digital data repository to obtain a plurality of digital content items and generate classifications of the digital content items based on data elements of the digital content items. Additionally, the disclosed systems generate a mapping between the digital content items and a data policy based on the classifications of the digital content items. Further, based on the mapping and attributes of the digital content items, the disclosed systems determine whether the digital content items correspond to one or more digital data requirements of a data policy (e.g., whether the digital content items violate the data policy according to the digital data requirements). Moreover, the disclosed systems cause computing devices to modify the digital content item by implementing a downstream operation associated with the digital data requirements in one or more downstream operations. The disclosed systems thus provide efficient and flexible management of computing systems by utilizing downstream operations to categorize digital data across a variety of data processes within a computing environment. The disclosed systems also provide an efficient graphical user interface for changing, and validating the changes to, digital content items according to downstream operations associated with the digital data requirements.

BRIEF DESCRIPTION OF THE DRAWINGS

Various aspects will be described and explained with additional specificity and detail through the use of the accompanying drawings.

FIG. 7 illustrates an example of a graphical user interface within a client application of a client device for selecting one or more categories of regulations and data policies to which an entity may be subject based on the types of data the entity handles in accordance with some aspects.

FIG. 13 illustrates an example of a graphical user interface within the client application of the client device displaying a listing of current violations in accordance with some aspects.

DETAILED DESCRIPTION

Figure 1:
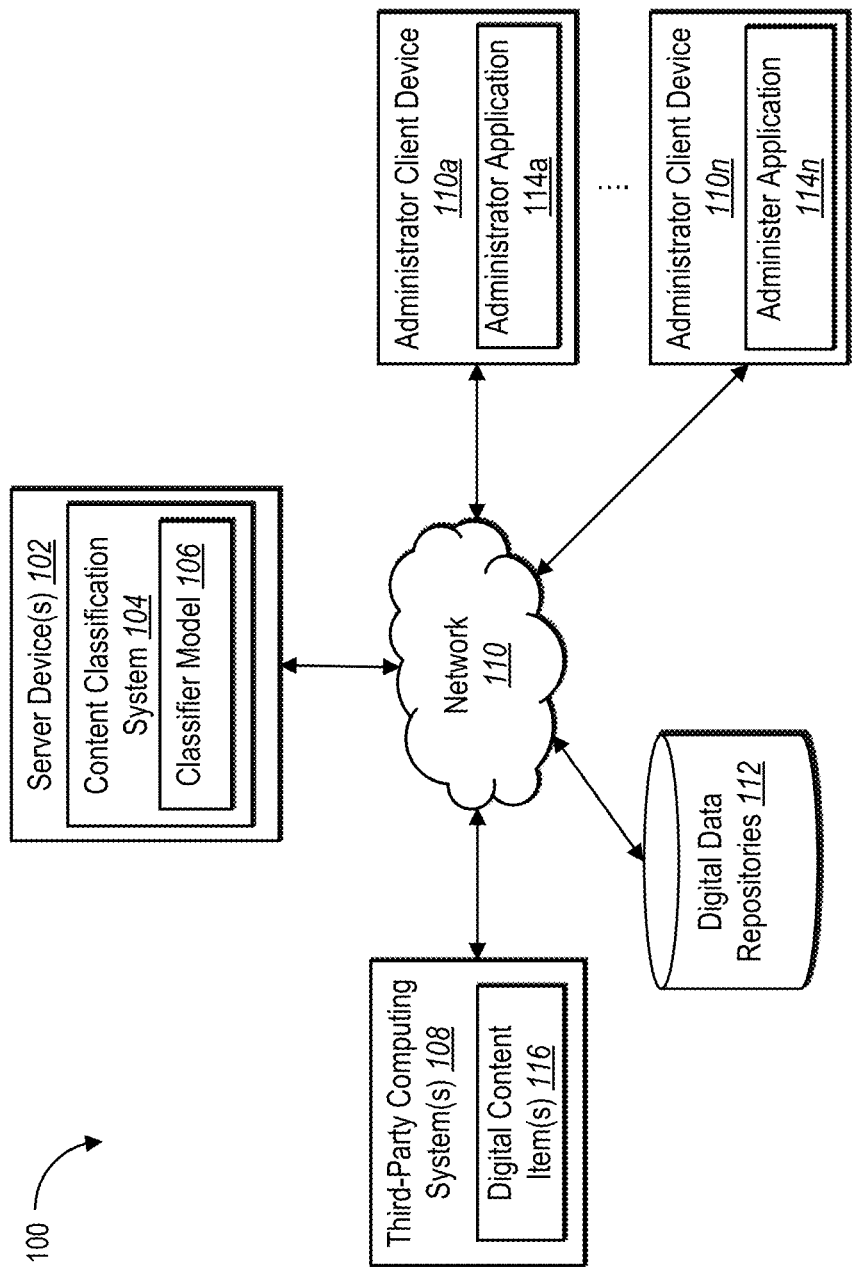
FIG. 1 illustrates an example of a system environment in which a content classification system can operate in accordance with some aspects.

This disclosure describes some aspects of a content classification system that classifies and modifies digital content items to satisfy digital data requirements of data policies. For example, the content classification system validates, enforces, and remediates digital data content corresponding to digital data requirements of a data policy based on data types covered by the data policy. In certain aspects, the content classification system generates classifications for digital content items by accessing digital content items and generating mappings between the digital content items and a data policy. The content classification system utilizes the mappings and digital data requirements of the data policy to determine whether the digital content items violate one or more elements of the data policy. In response to detecting violations of the data policy in one or more digital content items, the content classification system can perform various downstream operations to remediate the data policy violations, such as by causing various computing devices to modify the violating digital content items.

As mentioned, in some aspects, the content classification system provides tools for detecting violations of a data policy in connection with classifications of digital content items in a digital data repository. For example, the content classification system accesses digital content items at the digital data repository and classifies the digital content items according to a set of classifiers of a classifier model. Specifically, the content classification system utilizes the classifier model to classify each digital content item in the digital data repository based on data elements (e.g., contents and/or data attributes) of the digital content item. In some aspects, the content classification system generates a plurality of classifications for the digital content items and/or individual data elements of the digital content items according to a classification hierarchy.

In certain aspects, in connection with classifying the digital content item, the content classification system generates a mapping between the digital content item and a data policy. For example, the content classification system determines that specific classifications of data (e.g., specific data types of digital content items or contents of digital content items) are covered by the data policy. In some aspects, the content classification system utilizes a hierarchy of classifications to determine whether a particular digital content item is covered by the data policy. To illustrate, the content classification system can determine that a digital content item is covered by the data policy based on a first hierarchy level (e.g., associated with a particular data element) of the digital content item and/or a second hierarchy level (e.g., associated with a combination of data elements) of the digital content item. In some aspects, the content classification system determines clusters of digital content items in connection with the data policy, such as by categorizing digital content items to determine that a plurality of similar digital content items correspond to the data policy based on corresponding attributes of the digital content items).

Further, based on a mapping and attributes of a digital content item (or a cluster of digital content items), the content classification system determines whether the digital content item violates the data policy according to one or more digital data requirements of the data policy. In particular, the content classification system monitors attributes of digital content items classified in connection with the digital data requirements of the data policy. For example, in response to detecting that a particular attribute of a digital content item mapped to the data policy meets a threshold indicated by the digital data requirements, the content classification system can determine that the digital content item violates the data policy. In some aspects, the content classification system monitors digital content items in connection with more than one data policy and/or more than one set of digital data requirements based on a plurality of classifications of the digital content item in connection with a classification hierarchy. To illustrate, the content classification system can determine that a given digital content item violates one or more data policies or sets of digital data requirements based on the classifications of the digital content item mapping the digital content item to the data policies and/or sets of digital data requirements.

In certain aspects, the content classification system implements corrections for detected violations of data policies. In particular, in response to detecting that a digital content item violates a particular data policy, the content classification system communicates with one or more computing devices or systems to initiate one or more downstream operations to correct the violating digital content item. For example, the content classification system surfaces the policy violations and integrates with a third-party computing system to modify the violating digital content item or otherwise remediate the data policy. To illustrate, the content classification system causes one or more third-party computing devices to perform operations for merging, cloning, removing, or otherwise changing the digital content item based on the digital content item classification (e.g., a digital content item violation). Additionally, in some aspects, the content classification system implements various downstream operations in connection with modifying a digital content item that violates a data policy to ensure that additional digital content items continue to satisfy the digital data requirements of the data policy within the computing environment. Thus, the content classification system can correct existing digital content items that violate a data policy while preventing further violations of the data policy by other digital content items.

In additional aspects, the content classification system provides tools for managing data policy violations by digital content items via various graphical user interfaces. Specifically, the content classification system can provide tools selecting various data policies and/or digital data requirements to use in classifying and analyzing digital content items. The content classification system can also provide tools for initiating various scanning operations to detect digital content items that violate the selected data policies/digital data requirements. Additionally, the content classification system provides tools for remediating and validating remediation of digital content items that violate the data policies/digital data requirements and/or for correcting the causes of violations.

In some aspects, the content classification system utilizes a software/hardware integration (e.g., via one or more API calls, database operations, or executables installed on the computing devices) to automatically apply a specific downstream operation on a specific dataset or data type according to a set of digital data requirements of a data policy. To illustrate, in response to detecting digital content items that violate a data policy, the content classification system executes computing instructions (or causes a computing device to execute instructions) to implement a downstream operation to modify a computing function that accesses digital content items at a digital data repository. In additional embodiments, the content classification system provides tools for a user to implement such downstream operations at the digital data repository in connection with managing the digital content items.

Additionally or alternatively, certain aspects described herein can improve upon shortcomings of conventional systems in relation to managing computing systems that manage digital data according to various data policies. Specifically, conventional systems lack efficiency and flexibility in connection with complying with various data policies. For example, conventional systems typically include rigid computing system classification structures that fail to adapt to changes in data policies and/or changes in data assets or digital data that result in the digital data being out of compliance with the data policies. Indeed, the large scale nature of many computing systems subject to different data policies often results in such conventional systems being out of compliance due to the rigid nature of the computing system classification structures, data management, and their inability to detect violating digital content items in a timely manner.

Furthermore, changes to a particular data policy or data asset/data process that lead to non-compliant configurations of data handling by the computing systems of the conventional systems can result in inaccurate use of the data by one or more additional computing systems. To illustrate, if a conventional system fails to identify and correct a digital content item that violates a data policy, a computing system executing an additional data process involving the digital content item may generate, transmit, or otherwise handle data in a manner that also violates the data policy or produces data that violates the data policy. For instance, the conventional systems may utilize expired data, incorrectly stored PII, or other violating digital data to perform various data processes. This may result in non-compliant handling or generation of data in connection with the data policy.

Certain aspects of the disclosed content classification system provide advantages over these conventional systems. For example, the content classification system provides improved efficiency and flexibility for computing systems that manage digital data subject to various digital data requirements of one or more data policies. Specifically, in contrast to conventional systems with rigid computing system structures that do not adapt to changes in connection with different data policies and/or data assets, the content classification system provide tools for classifying various categories, types, and instances of digital content items in relation to various data policies to detect violations of the data policies. Furthermore, the content classification system can automatically modify the digital content items determined to violate a data policy to remediate the violation. In additional aspects, the content classification system can interact with various computing devices to implement such changes automatically and/or to implement various downstream operations (e.g., with one or more data processes) to prevent further violations.

More specifically, by leveraging integrations with various data assets (e.g., digital data repositories) to modify classified digital content item according to a data policy, the content classification system provides tools for quickly and easily correcting digital data that violate various internal or external data policies within computing environments. To illustrate, the content classification system provides automated tools or graphical user interface tools to easily modify digital content items based on their classifications according to the various data elements in the digital content items and digital data requirements of various data policies. In some aspects, the content classification system also leverages changes to the data policies, data assets storing the digital content items, and/or data processes to cause third-party computing systems (or otherwise communicate with the third-party computing systems) to automatically modify digital content items to ensure compliance of the data objects with the digital data requirements of the data policies. In this way, the content classification system can streamline data processing tasks by categorizing data in appropriate classifications which leads to a more efficient use of computational resources and optimized workflows for downstream operations.

Additionally or alternatively, certain aspects of the content classification system improve the accuracy of computing systems that manage digital data in accordance with requirements for various data policies. In particular, the content classification system utilizes dynamic classification of digital content items in connection with any number of data policies and data assets to accurately determine relationships between the data policies and stored digital content items across different domains of data. In particular, by classifying digital content items according to attributes and contents of the digital content items in relation to the data policies, the content classification system can automatically detect that specific digital content items or individual portions of digital content items violate a particular data policy (e.g., via the use of a classification hierarchy). In particular, the content classification system leads to faster data access times and reduces the computational load spent searching for digital content items relevant to one or more data policies. The content classification system can also perform operations to cause third-party computing systems to automatically remediate digital content items determined to violate the policies according to the classifications.

To illustrate, the content classification system can integrate with computing hardware of a third-party system to communicate with computing systems associated with (or otherwise including information about) downstream operations or data policies to detect changes to a given data asset and/or data policy. The content classification system can utilize such information to determine and recommend changes to digital content items to ensure that the digital content items comply with the data policy. As an example, the content classification system can automatically detect whether a particular computing system associated with a specific data process is utilizing the correct encryption for handling a specific data type (e.g., based on classifications of digital content items) and determine a modification to digital content items that do not have the correct encryption that would address such issues. The content classification system can thus automatically detect the need for modifications to specific digital content items and assist in addressing any non-compliance issues such as, for example, automatically causing a third-party system to modify one or more digital content items to implement the correct encryption according to a specific data policy.

Turning now to the figures, FIG. 1 includes an aspect of a system environment 100 in which a content classification system 104 is implemented. In particular, the system environment 100 includes server device(s) 102, administrator client devices 110a-110n, and third-party computing system(s) 108 in communication via a network 110. Moreover, as shown, the content classification system 104 includes digital data repositories 112. FIG. 1 also shows that the administrator client devices 110a-110n include administrator applications 114a-114n, the content classification system 104 includes a classifier model 106, and the third-party computing system(s) 108 include digital content item(s) 116.

As shown in FIG. 1, in some aspects, the server device(s) 102 include or host the content classification system 104. Specifically, the content classification system 104 includes, or is part of, one or more systems that classify digital data from the digital data repositories 112 and/or the third-party computing system(s) 108. For example, the content classification system 104 provides tools to the administrator client devices 110a-110n for classifying and managing data associated with an entity. In some aspects, the content classification system 104 provides tools to the administrator client devices 110a-110n via the administrator applications 114a-114n for classifying and managing information associated with the entity and/or data that the entity handles.

As used herein, the term "data object" refers to a digital object for tracking or managing systems, software, data sources, entities, or other functions or infrastructure involved in handling specified data for an entity. For example, a data object can include a digital representation of the entity itself, a sub-entity such as subsidiary of the entity, a business unit of the entity, a data asset, or a computing operation. To illustrate, a data object can represent a data element, such as a digital content item or a portion of a digital content item extracted from a digital data repository, and can include a pointer to a location (e.g., path) of the digital content item at the digital data repository. Additionally, a data object can include a "policy object" representing a set of requirements associated with a data policy for handling data in one or more data processes.

Additionally, in some aspects, a data object can include a "data asset object" representing a computing component for handling specified data for an entity in connection with one or more data processes. For example, the content classification system 104 generates/stores a data object representing a data asset including a computing component such as, but not limited to, a computing system, a software application, a website, a mobile application, or a data storage/repository. To illustrate, a data object for a data asset can represent a digital data repository (e.g., the digital data repositories 112) in the form of a database used for storing specified data. Additionally, a data object for a data asset can represent the third-party computing system(s) 108, or other systems. The content classification system 104 thus generates and stores a plurality of data objects (e.g., at the digital data repositories 112) representing different aspects of computing operations associated with the digital content item(s) 116 at the third-party computing system(s) 108 for use in various downstream operations, such as for verifying compliance with one or more data policies.

Additionally, as used herein, the term "data process" refers to a computing process that performs one or more actions associated with specified data. In some aspects, a data process is represented by a data object (i.e., a "data process object"). For example, the content classification system 104 generates/stores a data object representing a data process including, but not limited to, a computing process or action corresponding to execution of processing instructions to process, collect, access, store, retrieve, modify, or delete target data. To illustrate, for target data including credit card information and payment information associated with processing a credit card transaction, the content classification system 104 generates a data object to represent a data process that collects the credit card information through a form (e.g., webpage) provided via the website and processes the credit card information with the appropriate card provider to process the credit card transaction. Additionally, the content classification system 104 can generate mappings or other associations between various data objects (e.g., representing digital content items, data assets, data processes) according to one or more scanning operations.

In some aspects, the content classification system 104 also provides tools for using the data objects to manage functions or infrastructure subject to one or more data policies related to various laws, regulations, or standards applicable to an entity. To illustrate, certain types of data are subject to certain "digital data requirements," which refer to specific implementations of details associated with a data policy via downstream operations for handling (e.g., processed, transmitted, stored) data. Accordingly, the content classification system 104 analyzes the data objects (e.g., via one or more data analysis projects) to determine whether the functions or infrastructure represented by the data objects are in compliance with a "data policy" that refers to a set of standards or laws for handling specific data types or otherwise configuring an entity's functions or infrastructure in accordance with a corresponding standard (e.g., a set of internal entity practices or external practices set by a regulatory body such as the International Organization for Standardization).

As an example, for a data policy that indicates how to retain (e.g., length of time, storage requirements) a particular data type, digital data requirements for the data policy can indicate how to apply the data policy to a particular digital content item (e.g., a data retention time for the digital content item or an encryption for the digital content item) within a particular computing environment. In various aspects, a data policy can include digital data requirements that incorporate third-party requirements (e.g., replicating or inserting a requirement specified in an ISO standard or in a legal authority for a certain jurisdiction), are based on third-party requirements (e.g., a requirement meeting criteria specified in multiple third-party frameworks or by different legal authorities in different jurisdictions), and/or are independent of any third-party requirements (e.g., policies developed by an entity without reliance on third-party frameworks or that are not required by any legal authority).

In some aspects, the content classification system 104 includes various tools or functions for satisfying a requirement of a data policy for a computing environment. An example of requirements associated with data policies can include procedures or practices for handling specific data types that entities are required to follow in connection with a regulation governing security or privacy. For instance, a data policy can include requirements for handling personally identifiable information, financial information, medical information, legal information, or other data types or subsets of data types in computing devices or transmissions between computing devices. The content classification system 104 can thus provide tools for performing an action to install or enact a particular data process or downstream operation for handling specific data types. To illustrate, downstream operations can include redacting specific data types from digital content items, encrypting specific data types, grouping specific data types, excluding specific data types from communications, etc. Furthermore, installed data processes can prevent future violations of a particular data policy.

According to some aspects, the content classification system 104 generates or manages data objects by communicating with the digital data repositories 112 and/or the third-party computing system(s) 108. Specifically, the content classification system 104 can communicate with the digital data repositories 112 and/or the third-party computing system(s) 108 to determine or otherwise obtain information associated with the data objects. For example, the content classification system 104 can communicate with third-party computing system(s) 108 to provide information to the third-party computing system(s) 108 (or to the administrator client device 110*a*) and/or to cause the third-party computing system(s) 108 to perform actions for modifying a digital content item(s) 116 or otherwise remediate a digital data violation. In some aspects, one or more of the administrator client devices 110*a*-110*n* control or use the third-party computing system(s) 108 and/or the digital data repositories 112 for the entity. The content classification system 104 may be configured to communicate with the digital data repositories 112 and/or the third-party computing system(s) 108 on behalf of the entity via an integration that is installed on the content classification system 104 and is configured with the entity's credentials (e.g., via an integrated data extraction software application). The content classification system 104 can obtain metadata or other information about the infrastructure or functions used by the entity and thereby populate attributes of the data objects with this information.

In some aspects, the term "data extraction software application" for integrating the content classification system 104 with one or more devices/systems refers to a computing application that operates on a computing device to extract data from the computing device or another computing device. For example, the content classification system 104 includes a data extraction software application to access the digital data repositories 112 utilizing credentials (e.g., login information, tokens) and extract (e.g., obtain) data including files, directories, or data within files. Additionally, in some aspects, the content classification system 104 utilizes a data extraction software application to install one or more scripts, functions, or components of the data extraction software application at one or more other computing devices (e.g., the digital data repositories 112 and/or the third-party computing system(s) 108).

In additional aspects, the content classification system 104 communicates with the administrator client devices 110*a*-110*n* to obtain information associated with the data objects or to provide information about the data objects for display within the administrator applications 114*a*-114*n*. For instance, the content classification system 104 can obtain, via user input received from an administrator client device, metadata or other information about the infrastructure or functions used by the entity and thereby populate attributes of the data objects with this information.

In some aspects, the third-party computing system(s) 108 include server devices, individual client devices, or other computing devices associated with an entity. For instance, a third-party computing system includes one or more computing devices for performing a data process involving handling data associated with one or more operations of the entity subject to a particular data policy. To illustrate, the third-party computing system includes one or more server devices that generate, process, store, or transmit payment card processing data subject to PCI DSS in one or more jurisdictions.

In some aspects, the server device(s) 102 include a variety of computing devices, including those described below with reference to FIG. 17. For example, the server device(s) 102 includes one or more servers for storing and processing data associated with data process implementation and management. In some aspects, the server device(s) 102 also include a plurality of computing devices in communication with each other, such as in a distributed storage environment. In some aspects, the server device(s) 102 include a content server. The server device(s) 102 also optionally includes an application server, a communication server, a web-hosting server, a social networking server, a digital content campaign server, or a digital communication management server.

In some aspects, each of the administrator client devices 110*a*-110*n* includes, but is not limited to, a desktop, a mobile device (e.g., smartphone or tablet), or a laptop including those explained below with reference to FIG. 17. Furthermore, although not shown in FIG. 1, the administrator client devices 110a-110n can be operated by users (e.g., a user included in, or associated with, the system environment 100) to perform a variety of functions. In particular, the administrator client devices 110a-110n performs functions such as, but not limited to, accessing, viewing, and interacting with data associated with managing classifications for the digital content item(s) 116 utilizing one or more data policies. In some aspects, the administrator client devices 110a-110n also perform functions for generating, capturing, or accessing data to provide to the content classification system 104 in connection with data processes for the classified digital content items. For example, the administrator client devices 110a-110n communicate with the server device(s) 102 via the network 110 to provide information (e.g., user interactions) associated with data objects and digital content items. Although FIG. 1 illustrates the system environment 100 with a plurality of administrator client devices, in some aspects, the system environment 100 includes a single administrator client device or other client devices. In some aspects, the administrator client devices 110a-110n or the server device(s) 102 also host the digital data repositories 112.

Additionally, as shown in FIG. 1, the system environment 100 includes the network 110. The network 110 enables communication between components of the system environment 100. In some aspects, the network 110 may include the Internet or World Wide Web. Additionally, the network 110 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 102, the administrator client devices 110a-110n, the digital data repositories 112, and the third-party computing system(s) 108 communicate via the network using one or more communication platforms and technologies suitable for transporting data and/or communication signals, including any known communication technologies, devices, media, and protocols supportive of data communications, examples of which are described with reference to FIG. 17.

Although FIG. 1 illustrates the server device(s) 102, the administrator client devices 110a-110n, the digital data repositories 112, and the third-party computing system(s) 108 communicating via the network 110, in alternative aspects, the various components of the system environment 100 communicate and/or interact via other methods (e.g., the server device(s) 102, the administrator client devices 110a-110n, the digital data repositories 112, and/or the third-party computing system(s) 108 can communicate directly). Furthermore, although FIG. 1 illustrates the content classification system 104 and the digital data repositories 112 being implemented separately within the system environment 100, the content classification system 104 and the digital data repositories 112 can alternatively be implemented, in whole or in part, by a particular component and/or device within the system environment 100 (e.g., the server device(s) 102). Additionally, in some aspects, the third-party computing system(s) 108 include the administrator client devices 110a-110n.

In some aspects, the server device(s) 102 support the content classification system 104 on the administrator client devices 110a-110n. For instance, the server device(s) 102 generates/maintains the content classification system 104 and/or one or more components of the content classification system 104 for the administrator client devices 110a-110n. The server device(s) 102 provides the generated content classification system 104 to the administrator client devices 110a-110n (e.g., as a software application/suite). In other words, the administrator client devices 110a-110n obtain (e.g., download) the content classification system 104 from the server device(s) 102. At this point, the administrator client devices 110a-110n are able to utilize the content classification system 104 to manage compliance of data objects and digital content items according to one or more data policies independently from the server device(s) 102.

In alternative aspects, the content classification system 104 includes a web hosting application that allows the administrator client devices 110a-110n to interact with content and services hosted on the server device(s) 102. To illustrate, in some aspects, the administrator client devices 110a-110n access a web page supported by the server device(s) 102. The administrator client devices 110a-110n provide input to the server device(s) 102 to perform compliance management operations, and, in response, the content classification system 104 on the server device(s) 102 performs operations to view/manage data associated with digital data processing. The server device(s) 102 provide the output or results of the operations to the administrator client devices 110a-110n.

Figure 2:
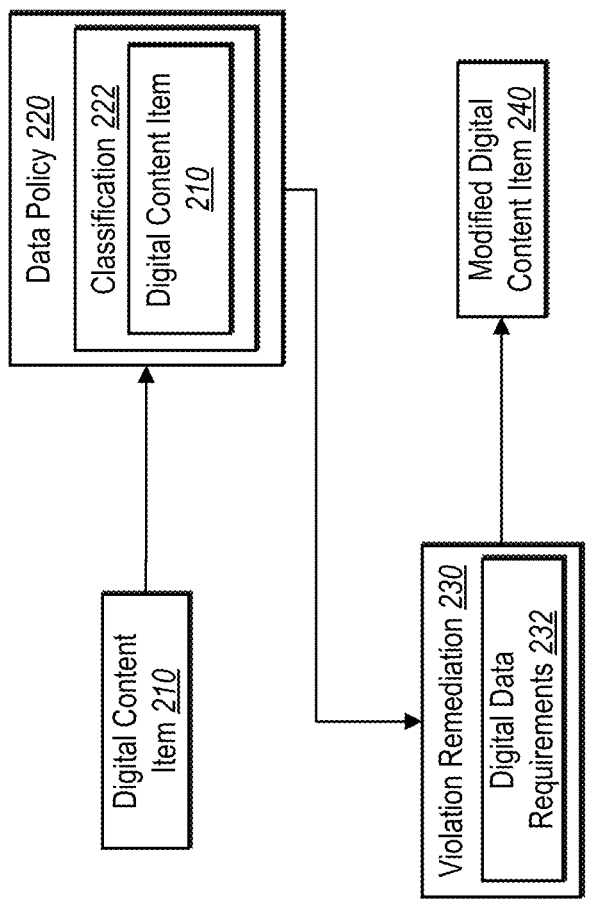
FIG. 2 illustrates an example of the content classification system classifying and modifying a digital content item in accordance with some aspects.

As mentioned, the content classification system 104 manages computing systems to classify and modify digital content items associated with an entity in connection with specific data policies. FIG. 2 illustrates an example overview of classifying and modifying a digital content item. For example, the content classification system 104 provides tools for determining the classification of a digital content item, monitoring for violations of data policies according to digital data requirements, and implementing correction operations to remediate the violations.

For example, as illustrated in FIG. 2, the content classification system 104 accesses a digital content item 210. For example, the content classification system 104 accesses a digital content item 210 from a digital data repository associated with an entity via an integration with a third-party computing system. The digital content item 210 includes a variety of data elements (e.g., first name, last name, address, work history, SSN) based upon the type of the digital content item 210. The content classification system 104 utilizes the data elements of the digital content item 210 to dynamically determine the classification 222 of the digital content item 210, such as in connection with one or more data polices (e.g., data policy 220). For example, the content classification system 104 dynamically associates the digital content item 210 with the classification 222 by utilizing a classifier model to analyze the attributes of the digital content item (or the individual data elements of the digital content item). For example, the attributes of the digital content item 210 can include data elements within the digital content item 210 such as name, address, work history, SSN. The attributes of the digital content item 210 can also include metadata associated with the digital content item 210 such as digital content item date of creation, digital content item type or extension, digital content item modification date, security status, or other metadata.

As used herein, the term "classifier model" refers to one or more computer functions that classify digital data into various categories. For example, a classifier model processes data elements and/or digital content items including data elements and outputs a classification for each data element (or digital content item) according to a classification scheme. In some aspects, the classifier model includes a machine-learning model or neural network that learns to classify data into a set of categories based on features, characteristics, or other attributes of the data element. In some aspects, the classifier model classifies data by utilizing one or more classifiers that match data elements to classifier labels.

As further illustrated, the content classification system 104 utilizes the data policy 220 to determine various requirements for handling different data types across one or more domains of digital content. Accordingly, the content classification system 104 analyzes the digital content item 210 to determine a mapping of applicable data content items, data objects, and data processes to the data policy 220 based on the classification 222 for the digital content item 210. An example of generating these mappings includes updating a table or other data structure with records or other data objects containing data identifying relationships between digital data requirements (e.g., a particular digital content item is subject to a particular data policy imposing certain data retention requirements) and corresponding data content items, data objects, and/or data processes.

For example, in some aspects, a data policy includes a set of computer-based requirements and thresholds for the digital content item 210 based on the classification 222 of the digital content item 210. As mentioned, the data policy 220 indicates how to handle various digital content items within an entity's infrastructure in accordance with corresponding standards. To illustrate, the content classification system 104 analyzes the data elements of the digital content item 210 to determine the appropriate classification 222 of the digital content item 210. Further, the content classification system 104 generates a mapping of the digital content item 210 to the classification 222 in accordance with the data policy 220 and the corresponding standards. An example of generating these mappings includes updating a table or other data structure with records or other data objects containing data identifying a relationship between one or more digital content items and one or more classifications.

As further illustrated, the content classification system 104 monitors the digital content item 210 to determine violations of the digital data requirements 232 of the data policy 220. In particular, in response to generating a mapping between the digital content item and the data policy based on the classification 222, the content classification system 104 determines whether the digital content item 210 violates the data policy 220 based on digital data requirements 232 of the data policy 220. Indeed, the content classification system 104 can monitor and manage violations of the data policy 220 according to digital data requirements 232 associated with the data policy 220. For example, based on the classification 222 and in response to detecting that a particular attribute of a digital content item 210 mapped to the data policy 220 meets a threshold or other value/requirement of the digital data requirements 232, the content classification system 104 can determine that the digital content item 210 violates the data policy 220.

Further, in response to detecting a violation of the digital data requirements 232 of the data policy 220, the content classification system 104 performs a violation remediation 230 or communicates with one or more devices or systems to perform the violation remediation. For example, in response to determining that the digital content item 210 violates the digital data requirements 232, the content classification system 104 communicates with a third-party computing system or an administrator client device to perform a violation remediation 230 by modifying one or more data processes associated with the digital content item 210. For example, the content classification system 104 surfaces information to the third-party computing system to remediate the violating digital content item 210 by performing operations for merging, cloning, removing, or otherwise changing the digital content item 210 based on the digital content item classification 222.

In one or more additional aspects, when the content classification system 104 determines that the digital content item 210 violates the digital data requirements 232, the content classification system 104 communicates with one or more devices or systems to implement various data processes in connection with modifying the digital content item 210 (or digital data repositories including the digital content item 210) to ensure that additional digital content items continue to satisfy the digital data requirements 232 of the data policy 220 within the computing environment. In particular, the content classification system 104 determines that the classification 222 (and corresponding digital content item 210) corresponds to data controls for one or more products, organizational units, geographic regions, etc. Indeed, the content classification system 104 generates, manages, and stores data objects representing a plurality of data processes, in connection with managing classified digital content items based on one or more data policies. The content classification system 104 utilizes data objects to manage changes to the digital content item 210 based on the corresponding data processes and communicates with a third-party system to generate a modified digital content item 240 (e.g., by deleting, adding, or modifying content). Thus, the content classification system can correct existing digital content items (or communicate with a device or system to correct the existing digital content items) that violate a data policy while preventing further violations of the data policy by other digital content items.

Figure 3:
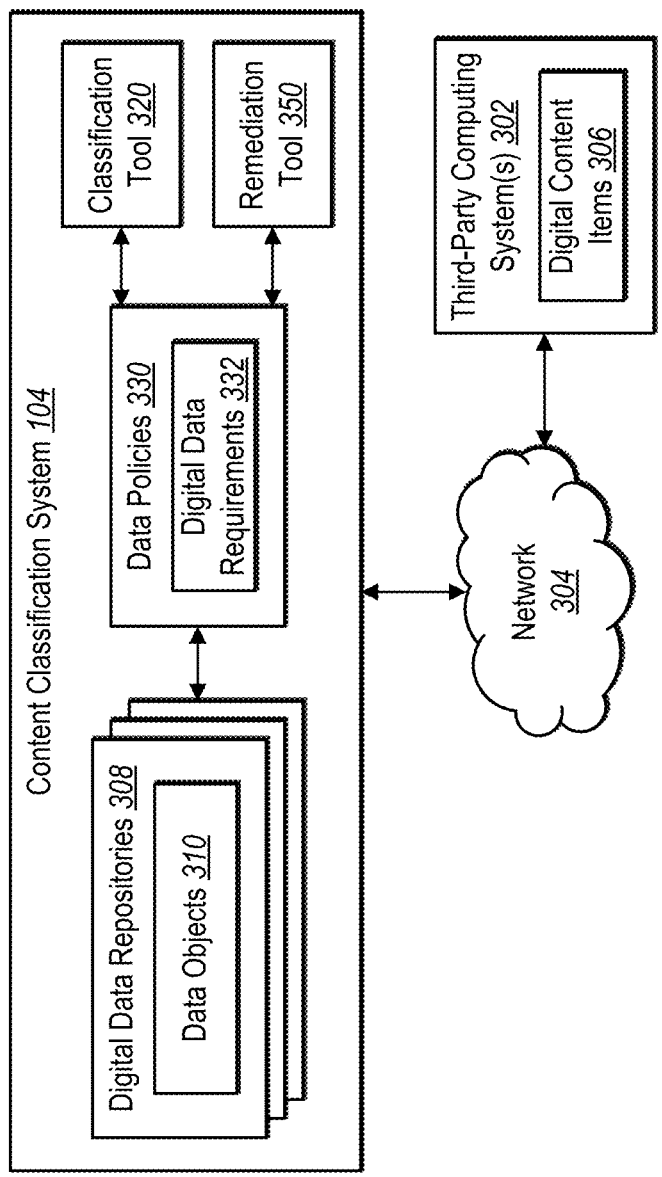
FIG. 3 illustrates an example illustrates an example environment in which the content classification system classifies and manages a digital content item via an integration with a third-party computing system in accordance with some aspects.

In some aspects, the content classification system 104 generates, manages, and stores data objects representing a digital content items (or data elements of digital content items) in connection with managing and classifying digital content items in digital data repositories. FIG. 3 illustrates an example environment in which the content classification system 104 classifies and manages a digital content item of an entity(s) via an integration with a third-party computing system according to one or more data policies in accordance with one or more environments.

FIG. 3 illustrates that the content classification system 104 includes a classification tool 320 to manage the classification associated with handling data types via an integration with a third-party computing system. For example, the classification tool 320 classifies digital content items 306 stored at, or otherwise associated with, third-party computing system(s) 302 according to a set of classifiers of a classifier model within a classification hierarchy that includes multiple levels, clusters, or tiers. Specifically, the content classification system utilizes the classifier model to classify each of the digital content items 306 based on data elements (e.g., contents and/or attributes) of the digital content items 306. In some aspects, the content classification system generates a plurality of classifications for the digital content items 306 and/or individual data elements of the digital content items 306 according to the classification hierarchy. Further, FIG. 3 illustrates that the content classification system 104 communicates with third-party computing system(s) 302 (e.g., one or more computing devices associated with the entity) via a network 304 to provide management of the classification associated with digital content items 306.

As illustrated in FIG. 3, the content classification system 104 includes digital data repositories 308. In particular, the digital data repositories 308 include data objects 310 for tracking or managing systems, software, data sources, entities, or other functions or infrastructure involved in handling specified data associated with one or more entities (e.g., the third-party computing system(s) 302). To illustrate, a first digital data repository of the digital data repositories 308 includes data objects 310 associated with a first entity, a second digital data repository of the digital data repositories 308 includes data objects 310 associated with a second entity, etc. Alternatively, the digital data repositories 308 store different types of data objects 310 within each digital data repository. Accordingly, a single digital data repository of the digital data repositories 308 may store data objects 310 associated with a plurality of different entities. Furthermore, the digital data repositories 308 may store data objects 310 for an entity across a plurality of digital data repositories 308.

The digital data repositories 308 store data objects 310 associated with the digital content items 306 of the third-party computing system(s) 302. For instance, the digital data repositories 308 store data objects 310 representing (and mapping) the digital content items 306 and one or more downstream operations in connection with the digital content items 306. In some aspects, the digital data repositories 308 are contained within the third-party computing system(s) 302.

In some aspects, the content classification system 104 determines specific digital data requirements 332 for the digital content items 306. For example, the content classification system 104 can determine one or more data policies 330 in connection with the digital content items 306 that establish the digital data requirements 332. In at least some aspects, the data policies 330 include or correspond to a digital representation of a set of operations to assess the digital content items 306, such as in connection with certifying privacy or security requirements according to one or more standards or regulations. Accordingly, a digital representation of digital data requirements for a particular data policy includes one or more files indicating required attributes or data elements of digital content items for complying with the data policies 330.

According to one or more additional aspects, the content classification system 104 communicates with the third-party computing system(s) 302 to modify various digital content items 306 in response to detecting changes to a digital data requirement. For example, in response to determining a change to a particular digital data requirement in connection with one or more data policies, the content classification system 104 can cause (or otherwise communicate with) the third-party computing system(s) 302 to modify corresponding digital content items 306. To illustrate, for a data policy that indicates how to retain (e.g., length of time, storage requirements) a particular data type, the digital data requirements for the data policy can indicate how to apply the data policy to a particular digital content item 306 (e.g., a data retention time for the digital content item or an encryption for the digital content item). The content classification system 104 can utilize downstream operations (e.g., via the third-party computing system(s) 320) to ensure that hardware and software processes and infrastructure comply with specific digital data requirements 332 via the various data objects 310 of the digital data repositories 308.

In some aspects, the content classification system 104 utilizes the digital data requirements 332 to analyze data objects 310 associated with data processes to determine a violation of the data policies 330. Specifically, the content classification system 104 (or another system) utilizes data objects 310 to determine whether the digital content items 306 are in compliance with one or more data policies 330 according to the digital data requirements 332. For instance, the content classification system 104 can determine whether digital content items associated with a particular classification are in compliance with the digital data requirements 332 of the data policies 330. To illustrate, the content classification system 104 can utilize the data objects 310 (e.g., via metadata stored in the data objects 310) to determine whether a data policy indicating specific data encryption requirements is correctly implemented for a classification of digital content items involving personally identifiable information in a payment transaction process by analyzing corresponding data objects 310.

Indeed, in some aspects, the content classification system 104 utilizes the classification tool 320 to dynamically manage digital content items 306. As an example, the content classification system 104 classifies a resume (e.g., a digital content item) utilizing the classification tool 320 based on data elements of the resume (e.g., PII, full name, email, address). In some aspects, the content classification system 104 classifies the resume according to a plurality of classification levels of a classification hierarchy based on individual data elements in the resume, combinations of data elements of the resume, and/or metadata or other context data associated with the resume (e.g., additional digital content items stored with the resume). For example, the content classification system 104 can classify the resume with a "hiring documents" classification (e.g., classification level 1) and an "employee data" classification (e.g., classification level 2) based on the data elements of the resume or digital content items linked to or stored with the resume within an "employee John Doe" cluster (e.g., classification data object cluster). Furthermore, the content classification system 104 maps the resume to the data policies 330 utilizing the digital data requirements 332.

The content classification system 104 further dynamically employs the remediation tool 350 to validate digital content items 306 corresponding to the applicable data objects 310 and remediate any violation of the digital data requirements 332 associated with the digital content items 306. For example, in response to detecting that the resume violates data policies 330, the content classification system 104 initiates one or more downstream operations (or communicates with one or more computing devices to perform one or more downstream operations) to correct the violating resume. In particular, the content classification system 104 dynamically monitors data policies 330 and communicates with the third-party computing system(s) 302 to merge, clone, remove, or otherwise change the resume (e.g., delete) the resume at the third-party computing system(s) 302 based on the applicable data policy and the digital content items 306 classification. In some aspects, the content classification system 104 executes the remediation tool 350 to cause the digital content item to meet the digital data requirements 332 of the data policies 330 based on a user specified schedule. Additionally, in some aspects, the content classification system implements data processes in connection with modifying digital content items that violate the data policies 330 to ensure that additional digital content items continue to satisfy the digital data requirements 332 of the data policies 330. Thus, the content classification system can correct (or communicate with one or more devices/systems to correct) existing digital content items 306 that violate a data policy while preventing further violations of the data policies 330 by other digital content items.

Figure 4:
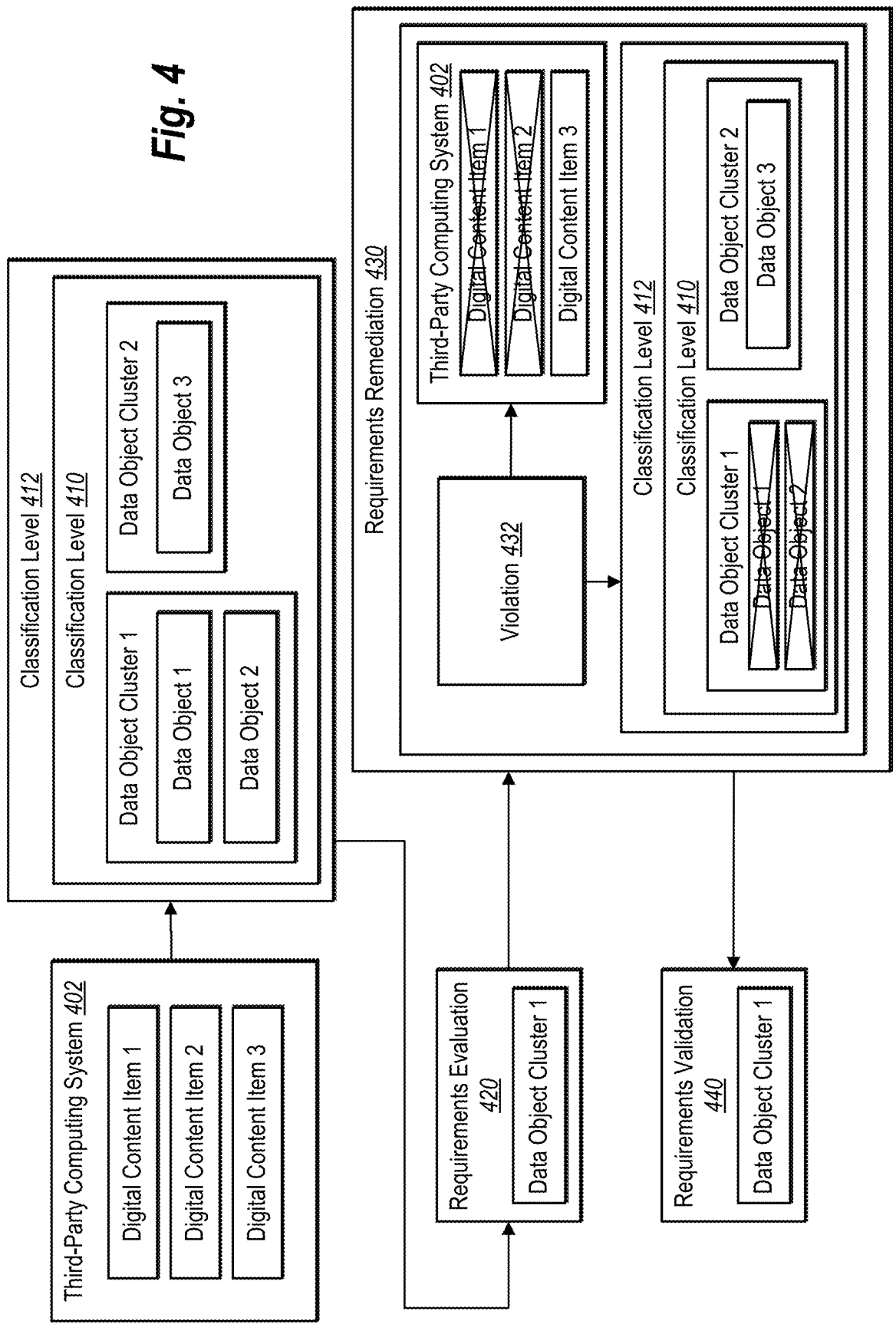
FIG. 4 illustrates an example of the content classification system modifying digital content items utilizing a classification hierarchy in accordance with some aspects.

In some aspects, the content classification system 104 manages classification hierarchies in connection with various digital content items. FIG. 4 illustrates an example of the content classification system 104 utilizing a classification hierarchy to determine applicability and compliance of the digital content items with one or more data policies in accordance with some aspects. As shown, the content classification system 104 accesses digital content items from a third-party computing system 402.

In this example, the content classification system 104 utilizes a classifier model to classify each digital content item in the digital data repository based on data elements (e.g., contents and/or attributes) of the digital content item. This can include the content classification system utilizing a hierarchy of classifications to determine whether a particular digital content item is covered by the data policy. In some aspects, the content classification system determines clusters of digital content items (e.g., via representative data objects) associated with the data policy, such as by categorizing digital content items to determine that a plurality of similar digital content items correspond to the data policy based on corresponding attributes of the digital content items. For instance, the content classification system assesses a threshold similarity of the digital content items relative to a particular category or classification and/or to each other to categorize the digital content items based on the criteria or features related to the cluster of the digital content items. For example, the content classification system 104 utilizes a similarity threshold to determine if a digital content item corresponds to a category of digital content. To illustrate, the content classification system 104 analyzes a digital content item of a resume to determine the resume corresponds to a hiring documents classification and/or an employee data classification based on attributes of the digital content item meeting a similarity threshold to hiring documents and/or employee data (e.g., job application, personal information).

As shown in FIG. 4, the content classification system generates one or more classifications for the digital content items and/or individual data elements of the digital content items according to the classification hierarchy. In particular, the content classification system 104 categorizes a "Data Object 1" corresponding to "Digital Content Item 1" and a "Data Object 2" corresponding to "Digital Content Item 2" within the "Data Object Cluster 1." Further, the content classification system 104 categorizes a "Data Object 3" corresponding to the "Digital Content Item 3" within the "Data Object Cluster 2." For example, based on determining that the "Digital Content Item 1" and "Digital Content Item 2" contain data elements that meet a similarity threshold requirement for "Data Object Cluster 1," the content classification system 104 categorizes the "Data Object 1" and the "Data Object 2" within the "Data Object Cluster 1." In addition, based on determining that the "Digital Content Item 3" contains data elements that meet a similarity threshold requirement for "Data Object Cluster 2," the content classification system 104 categorizes the "Data Object 3" within the "Data Object Cluster 2."

Further, the content classification system 104 determines that the first classification hierarchy level (e.g., classification level 410) includes the "Data Object Cluster 1" and "Data Object Cluster 2." For example, based on determining that the "Data Object Cluster 1" and "Data Object Cluster 2" correspond to data elements that meet a similarity threshold requirement for the classification level 410, the content classification system 104 categorizes the "Data Object Cluster 1" and "Data Object Cluster 2" within the classification level 410. To illustrate, the "Data Object Cluster 1" and the "Data Object Cluster 2" may have different initial categories but be classified into the same classification level 410 by the classifier model. As an example, the content classification system 104 can determine different groups of data (e.g., SSNs and employee contact information) that fall within the same category (e.g., PII). Alternatively, the classifier model can cluster the corresponding data objects into different classification levels and/or data object clusters according to the data elements of the corresponding digital content items.

Moreover, the content classification system 104 determines that the second classification hierarchy level (e.g., classification level 412) includes or is otherwise above the first classification hierarchy level (e.g., classification level 410). For example, based on determining that the classification level 410 correspond to data elements that meet a similarity threshold requirement for the classification level 412, the content classification system 104 categorizes the classification level 410 within the classification level 412. As an example, the content classification system 104 can determine that the data object clusters that correspond to a PII category also correspond to an employee data category. Indeed, as shown, the content classification system 104 determines a tiered classification hierarchy system and classifies the digital content items based on the tiered classification hierarchy. Although FIG. 4 illustrates classifying the "Digital Content Item 1," "Digital Content Item 2," and "Digital Content Item 3" utilizing the specified classification levels, the content classification system 104 can classify more or fewer digital content items utilizing more or fewer classification levels.

As further illustrated in FIG. 4, the content classification system 104 performs a requirements evaluation 420. As mentioned, the content classification system 104 generates a mapping between the digital content items and a data policy based on the classification of the digital content items. Furthermore, the content classification system 104 determines, based on the classification mapping and attributes of the digital content items, that the digital content item corresponds to one or more digital data requirements of a data policy. In response to detecting that a particular attribute of a digital content item mapped to the data policy meets a threshold (e.g., a similarity threshold) indicated by the digital data requirements, the content classification system can determine that the digital content item violates the data policy.

To illustrate, the content classification system 104 monitors attributes of digital content items (e.g., "Data Object 1," "Data Object 2," and "Data Object 3") classified in connection with the classification mapping. As shown, the content classification system 104 determines that the "Data Object Cluster 1" (and the corresponding "Data Object 1" and "Data Object 2") corresponds to one or more digital data requirements of the data policy (e.g., meets a similarity threshold) based on attributes of the data cluster. In turn, the content classification system 104 generates a data object cluster comprising data object cluster members. For example, the content classification system 104 determines (via the corresponding data objects) that one or more data elements of the digital content items within the "Data Object Cluster 1" are associated with certain digital data requirements according to the digital data requirements of one or more data policies based on meeting a similarity threshold. Further, according to some aspects, the content classification system 104 determines that "Data Object 1" and "Data Object 2" violate one or more data policies and/or sets of digital data requirements based the requirements evaluation 420, the attributes of the data object cluster, and the classifications of the digital content items "Data Object 1" and "Data Object 2." Alternatively, the content classification system 104 can determine that only one data object (e.g., "Data Object 1") of "Data Object Cluster 1" violates the data policy.

Furthermore, the content classification system 104 performs a requirements remediation 430. For example, based on attributes of the data object cluster ("Data Object Cluster 1"), the content classification system 104 determines that digital content items (e.g., "Digital Content Item 1" and "Digital Content Item 2") violate the data policy (e.g., corresponding to classification level 410) according to the digital data requirements of the data policy. To illustrate, the digital content items of the data object cluster can share an attribute that corresponds to the data policy (e.g., based on the digital content items including a particular data element). Accordingly, the content classification system 104 can determine that one or more digital content items in the data object cluster violates the data policy, which can include the shared attribute of the digital content items in the data object cluster or a separate attribute that one or more of the digital content items includes (e.g., according to a timestamp of a particular digital content item in the data object cluster).

The content classification system 104 can also communicate with a computing device (e.g., third-party computing system 402) to modify the digital content items (e.g., "Digital Content Item 1" and "Digital Content Item 2") according to one or more data processes associated with the one or more digital data requirements of the data policy. To illustrate, based on the requirements evaluation 420, the content classification system 104 determines that the digital content items corresponding to "Data Object Cluster 1" are in violation of the digital data requirements. The content classification system 104 communicates with a computing device to perform downstream operations to remediate the violation. For example, as shown, based on a detection of a violation 432 (e.g., a data retention violation), the content classification system 104 deletes the "Data Object 1" and "Data Object 2" from within the "Data Object Cluster 1" and causes (or provides information to) the third-party computing system 402 to delete the corresponding "Digital Content Item 1" and "Digital Content Item 2" from within the third-party computing system 402. In additional aspects, the content classification system 104 provides a notification of the violation 432 to a computing device for remediating the violation 432 in connection with a user request or a task schedule.

As further shown, the content classification system 104 performs a requirements validation 440. In particular, the content classification system 104 determines whether the third-party computing system 402 successfully performed the requested remediation. For example, the content classification system 104 verifies that the third-party computing system 402 removed the "Digital Content Item 1" and "Digital Content Item 2" from within the third-party computer system infrastructure. Based on the removal of the "Digital Content Item 1" and "Digital Content Item 2" from within the third-party computer system, the content classification system 104 updates the applicable data policy to remove the "Data Object 1" and "Data Object 2" from the "Data Object Cluster 1."

To illustrate, the content classification system 104 classifies digital content in compliance with the digital data requirements of a data policy such as the system retention requirements mandated by the CPRA (California Privacy Rights Act). For example, the CPRA mandates that an employer computing system can retain payslips for a maximum of three years after the termination of an employee. Using FIG. 4 as an example, the content classification system 104 identifies payslip content items within the third-party computing system 402. The content classification system 104 further classifies all employee payslip data objects corresponding to the classification level 412 (e.g., "employee payslip" classification). In addition, the content classification system 104 classifies all terminated employee payslip data corresponding to the classification level 410 (e.g., "terminated employee payslip" classification). Moreover, the content classification system 104 classifies all payslip content items relating to "terminated employee 1" corresponding to "Data Object Cluster 1."

As noted, the content classification system 104 utilizes a tiered classification system to classify the digital content items from the third-party computing system 402 and dynamically manage compliance of the digital content items with one or more data policies. Furthermore, the content classification system 104 determines, based on the mapping and attributes of the digital content items, that the digital content item corresponds to one or more digital data requirements of a data policy (e.g., terminated employee payslip retention limits). As further shown in FIG. 4, the content classification system 104 performs (e.g., on a set schedule or on demand) a requirements evaluation 420 to monitor the digital data requirements applicable to the "Data Object Cluster 1" (e.g., when the termination date for the "terminated employee 1" meets a 3 year threshold). If the termination date for the "terminated employee 1" meets the 3 year threshold, the content classification system 104 performs a requirements remediation 430 to cause the payslip data objects within the "Data Object Cluster 1" and the payslip content items within the third-party computing system 402 to be deleted. The content classification system 104 performs the requirements validation 440 to determine whether the requirements remediation 430 was completed (and the "terminated employee 1" payslips have been removed from the third-party computing system 402).

Figure 5:
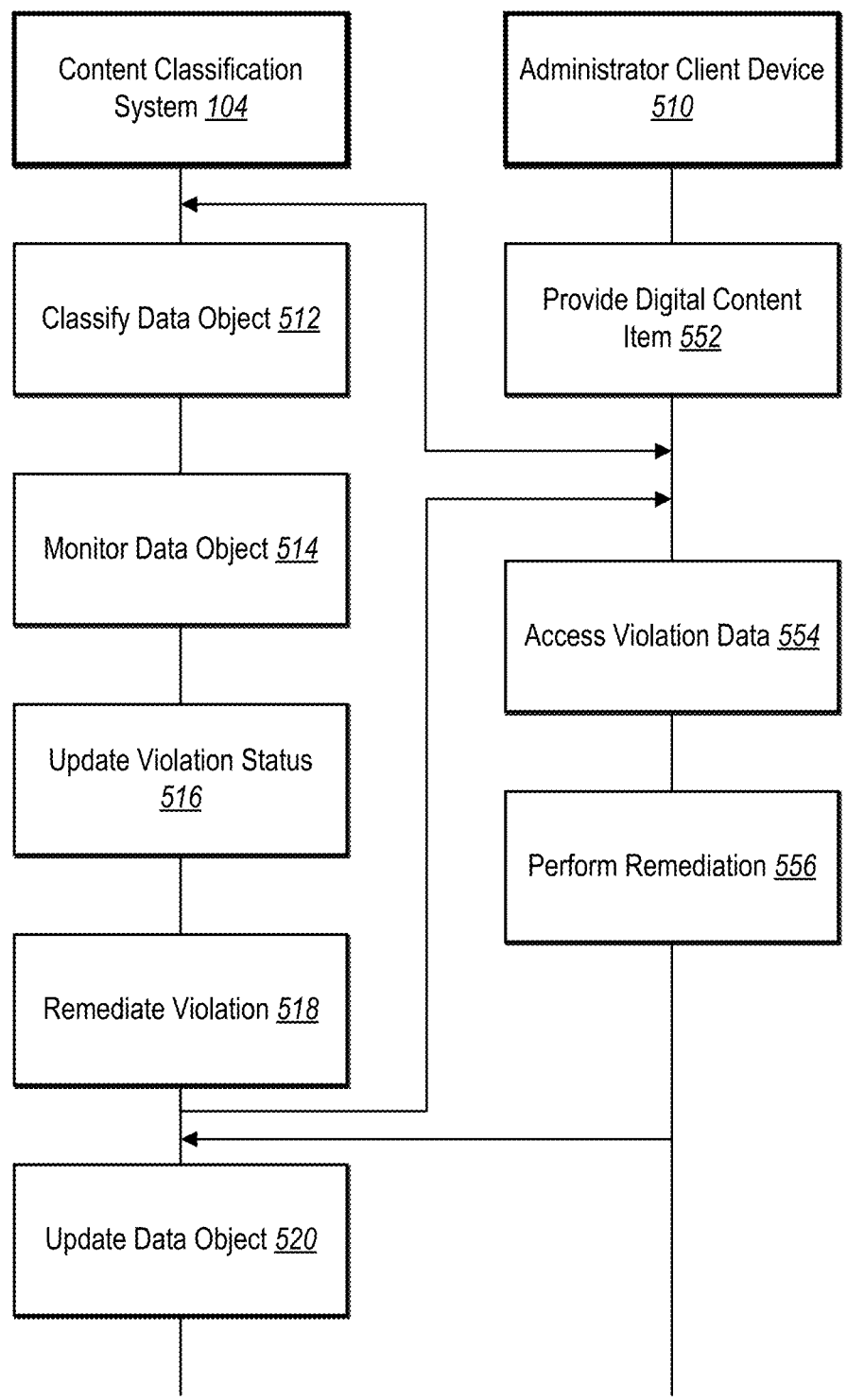
FIG. 5 illustrates an example of the content classification system interacting with an administrator client device to modify a digital content item in accordance with some aspects.

FIG. 5 illustrates an example of the content classification system interacting with an administrator client device to modify a digital content item in accordance with some aspects. For example, FIG. 5 illustrates the classification of digital content items by the content classification system 104 for determining compliance with a data policy.

For example, FIG. 5 illustrates an act 552 to provide a digital content item associated with (e.g., stored at or indicated by) an administrator client device 510 to the content classification system 104 by providing access to the digital content item. The content classification system 104 performs the act 512 to classify a data object (e.g., by creating or obtaining one or more data objects) based on the digital content item of the administrator client device 510 provided to the content classification system 104. As illustrated, the data object refers to a digital object for tracking or managing the digital content item associated with the administrator client device 510. In particular, the act 512 can include classifying a data object that is a digital representation of the digital content item associated with the administrator client device 510.

Further, the content classification system 104 performs the act 514 to monitor the data object based on its classification in connection with a data policy to detect digital data requirements violations of the digital content item. To illustrate, in some aspects, the content classification system 104 determines a set of digital data requirements for handling the data object and compares metadata of the data object to one or more thresholds or other information associated with the set of digital data requirements. In response to comparing the metadata of the data object to the threshold(s) of the digital data requirements, the content classification system 104 can determine that the data object (and corresponding digital content item) violates the data policy.

Further, the content classification system 104 performs act 516 to update the violation status corresponding to the data object. For example, in response to detecting a digital data requirements violation, the content classification system 104 updates the violation status of the data object. To illustrate, the content classification system 104 can store the violation status in metadata of the data object. Alternatively, the content classification system 104 can store the violation status in a separate table or data structure including information associated with detected violations for a data policy (or a plurality of data policies).

As further shown, the content classification system 104 performs act 518 to remediate the violation. For example, the content classification system 104 utilizes data object representing a digital content item to provide information regarding the violation status of the digital content item to the administrator client device 510 or to perform one or more operations to drive enforcement of the remediation action. Further, the content classification system 104 provides information regarding the corresponding remediation actions to the administrator client device 510 based on the digital content item of the administrator client device 510. In certain aspects, the content classification system 104 automatically enforces the remediation of the violation on the administrator client device 510 (or on another device with access to the digital content item). In some aspects, the content classification system 104 provides the remediation data (e.g., an action to perform and/or instructions to perform the action) to the administrator client device 510 and requests enforcement of the remediation at the administrator client device 510.

In addition, the administrator client device 510 performs the act 554 to access the violation data associated with the data object. For example, the administrator client device 510 generates and/or accesses the violation data in connection with one or more data policies for display within a graphical user interface as shown in FIGS. 6-14. Based on the violation data, the administrator client device performs the remediation identified by the content classification system 104. For example, based on the violation data provided to the administrator client device 510 by the content classification system 104, the content classification system 104 causes the administrator client device 510 to remediate the violation (e.g., automatically upon execution of the instructions by the administrator client device 510 or other device). Alternatively, the content classification system 104 can generate and provide options to execute the remediation at the administrator client device 510 (e.g., based on one or more user inputs).

In certain aspects, the content classification system 104 remediates the violation without further interaction from the administrator client device 510. For example, based on the evidence data, the content classification system 104 can perform the remediation by accessing, storing, retrieving, modifying, or deleting target digital content items of the administrator client device 510 or at another device or digital data repository where the digital content items are stored. To illustrate, in certain aspects, the content classification system 104 has permissions to access the digital content item for the remediation.

In some aspects, the content classification system 104 performs the act 520 to update the data object. In particular, the content classification system 104 updates the data object corresponding to the digital content item based on the status of the remediation of the violation. For example, if the administrator client device 510 or the content classification system 104 remediates the violation, the content classification system 104 updates the data object to reflect the remediation. In contrast, if the administrator client device 510 or the content classification system 104 does not remediate the violation, the classification system 104 updates the data object to reflect the lack of remediation (or, alternatively, does not update the data object). Additionally, the content classification system 104 can also provide one or more messages to the administrator client device 510 indicating that the remediation was not performed and that the digital content item still violates one or more data policies.

Figure 6:
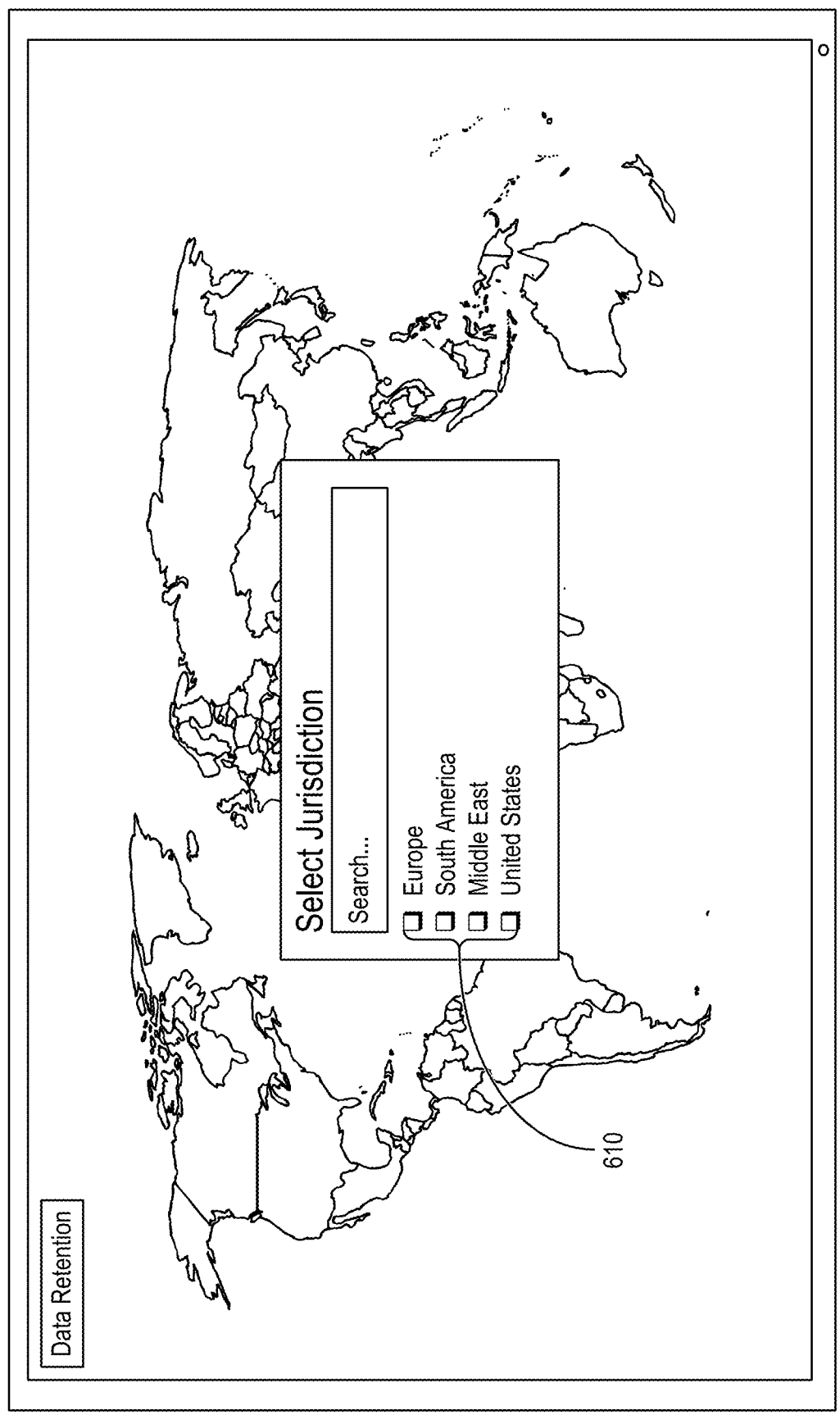
FIG. 6 illustrates an example of a graphical user interface of a client application on a client device including tools to indicate one or more locations associated with retention policies for digital content items for an entity in accordance with some aspects.

FIGS. 6-14 illustrate examples of graphical user interfaces of a client application on a client device for classifying, validating, and remediating digital content items in connection with one or more data policies in accordance with some aspects. For example, FIG. 6 illustrates an example graphical user interface including tools to indicate one or more locations associated with retention policies for digital content items for an entity. As shown, the client device displays a list of selectable locations 610 in which an entity can operate. To illustrate, the list of selectable locations 610 includes a listing of continents from which a user operating the client device can select one or more continents. Although FIG. 6 illustrates that the list of selectable locations 610 includes continents, the client device can alternatively display more granular locations, such as countries within a particular continent, states/provinces within a particular country, or counties. Additionally, the content classification system 104 can provide tools to allow for selecting a plurality of different types of jurisdictions, such as one or more locations and one or more fields of operation.

In connection with selecting one or more jurisdictions, the content classification system 104 provides options for selecting specific categories of data policies with various digital data requirements, such as fields of practice/operation (e.g., employment, health care, legal). FIG. 7 illustrates a graphical user interface within a client application of a client device for selecting one or more categories of regulations and data policies to which an entity may be subject based on the types of data the entity handles.

For example, the content classification system 104 can detect a selected location 710 (e.g., based on a selection via the graphical user interface of FIG. 6). In response to determining the selected location 710, the content classification system 104 provides, for display via the graphical user interface, a list of applicable categories of data policies that correspond to the selected location 710 according to one or more regulatory bodies associated with the selected location 710. For example, based on the selection of the "Employment" category and "All" data policies, the content classification system 104 provides "Employment Medical Records" and "Employment Payroll" data policies. Furthermore, as illustrated, the content classification system 104 provides for the selection of one or more categories and/or data policies from the list. In some aspects, the content classification system 104 also provides tools for selecting, generating, or otherwise indicating one or more internal data policies with one or more digital data requirements for handling various data types.

Figure 8:
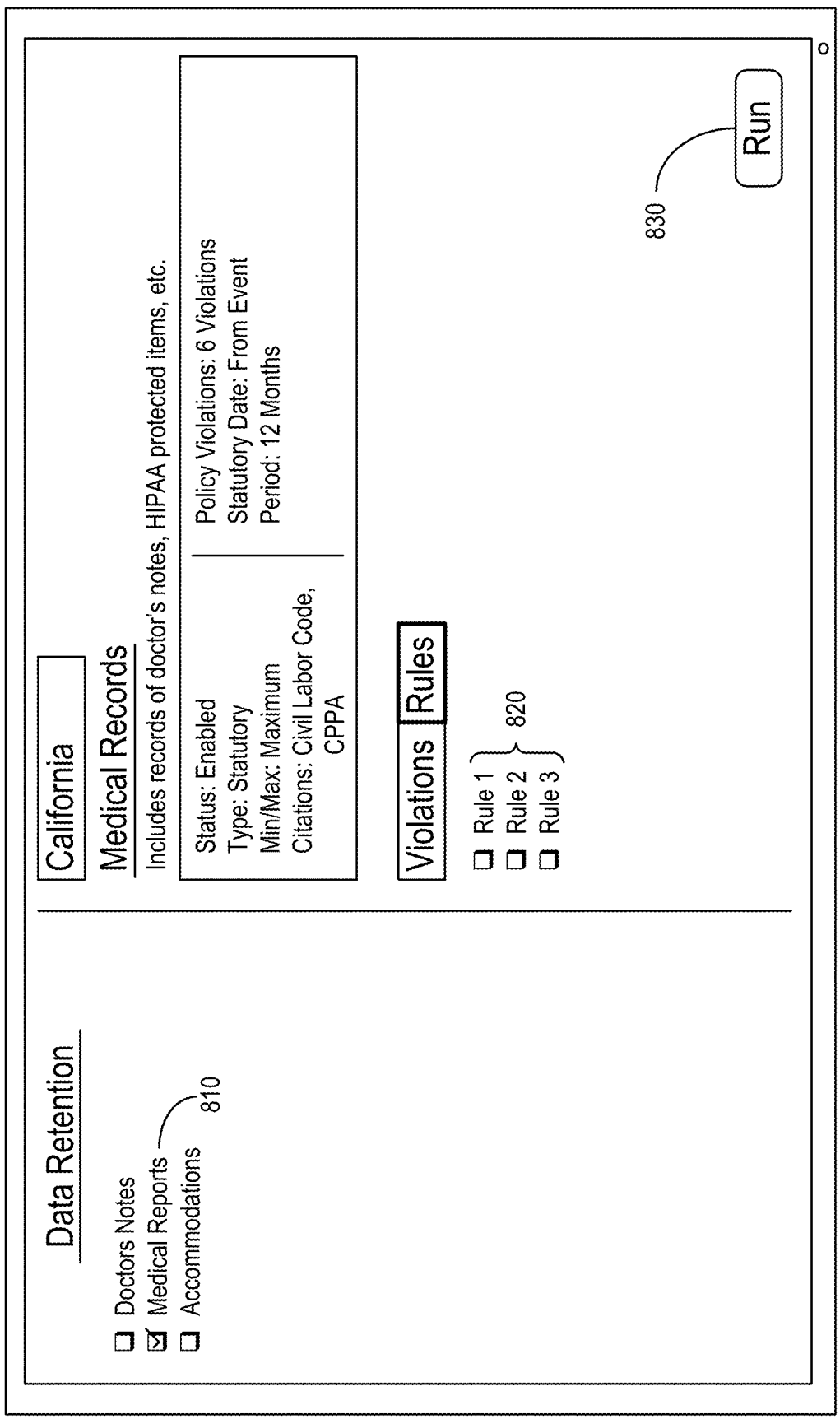
FIG. 8 illustrates an example of a graphical user interface within a client application of a client device for accessing/displaying one or more rules for data retention corresponding to a selected jurisdiction, category, and data classification in accordance with some aspects.

As further illustrated in FIG. 8, the content classification system 104 provides a graphical user interface within a client application of a client device for accessing/displaying one or more rules (e.g., digital data requirements) for data retention corresponding to a selected jurisdiction, category, and data classification. For instance, in response to detecting a selected classification (e.g., the selected classification 810) of "Medical Reports," the content classification system 104 provides a list of rules associated with the selected classification. To illustrate, in connection with the selected classification 810 of "Medical Reports," the content classification system 104 determines and provides one or more possible rules 820 (e.g., digital data requirements) associated with the selected classification 810 of "Medical Reports." In addition, based on the selection of "Rule 1," the content classification system 104 can accept an interaction with input element 830 to update the violation status of the digital content items associated with the classification 810 in real time. Accordingly, the content classification system 104 can provide tools for customizing a particular data policy for one or more datasets or data types.

Figure 9:
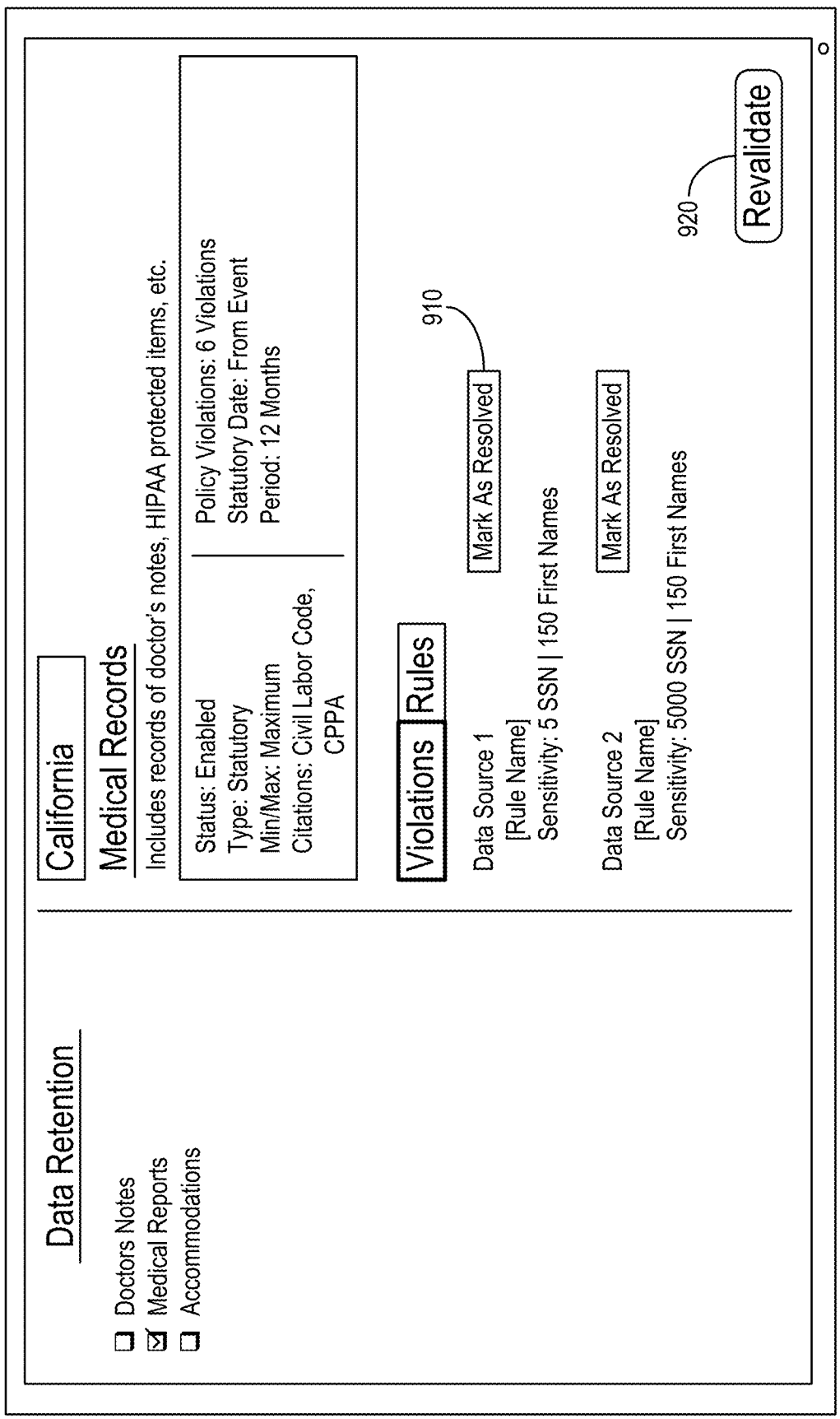
FIG. 9 illustrates an example of a graphical user interface for viewing existing data retention violations in accordance with some aspects.

As further illustrated in FIG. 9, the content classification system 104 provides a graphical user interface for viewing existing violations. For example, the content classification system 104 provides a listing of the data retention violations associated with the "Medical Reports" data policy in the selected jurisdiction of "California." As shown, the content classification system 104 provides input element 910 to allow the client device to mark selected violations as resolved. To illustrate, based on a client device interaction with the input element 910, the content classification system 104 resolves the violation for "Data Source 1" according to the digital data requirements of the data policy. In particular, the content classification system 104 provides tools for a user to resolve violations through the graphical user interface in connection with managing the digital content items. Further, the content classification system 104 provides input element 920 to allow the client device to initiate a revalidation and update the violations listing shown. To illustrate, based on a client device interaction with the input element 920, the content classification system 104 revalidates the violations for the "Medical Reports" in the selected jurisdiction of "California" to determine if the violations were successfully resolved.

Figure 10:
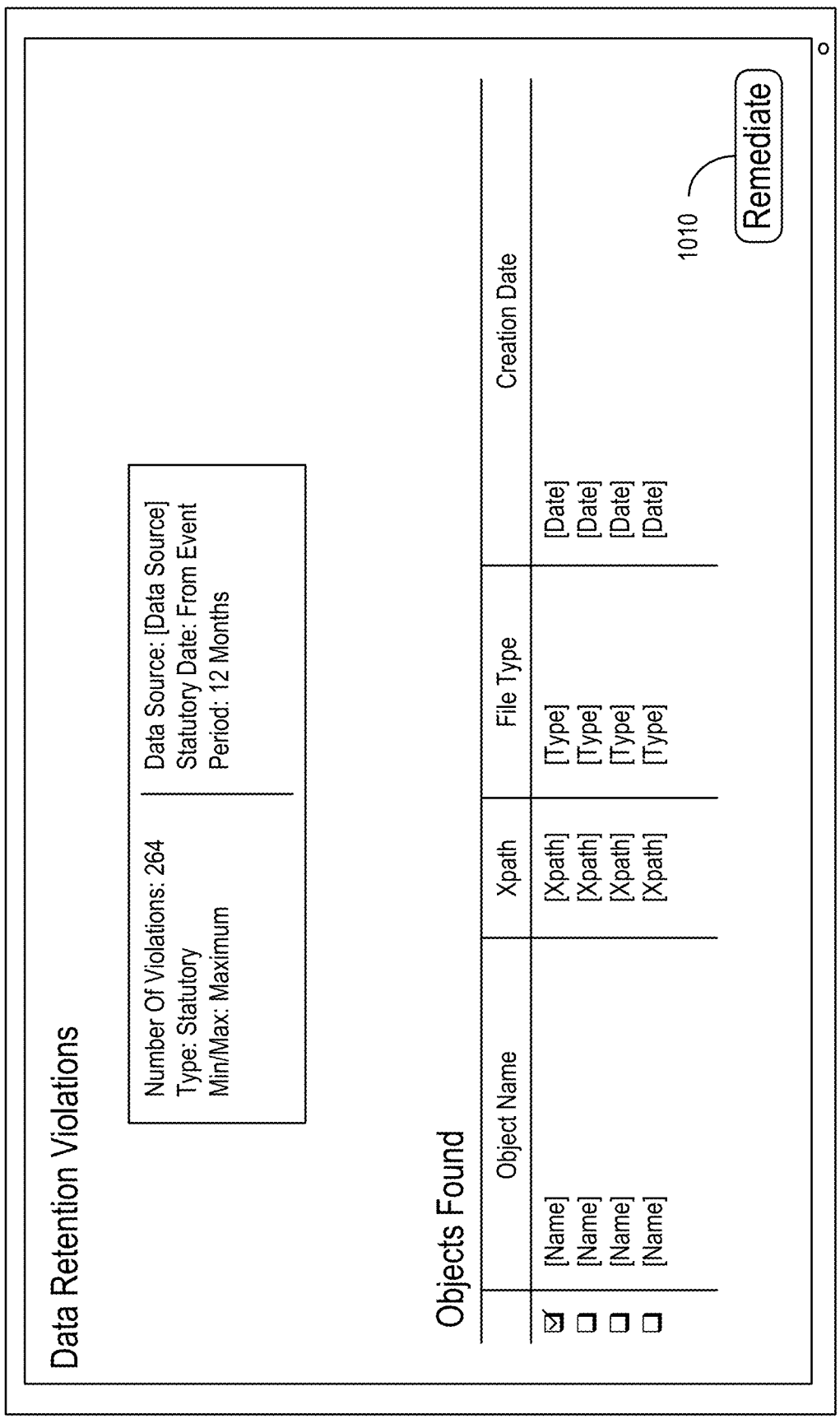
FIG. 10 illustrates an example of a graphical user interface within the client application of the client device for remediating violations in accordance with some aspects.
Figure 11:
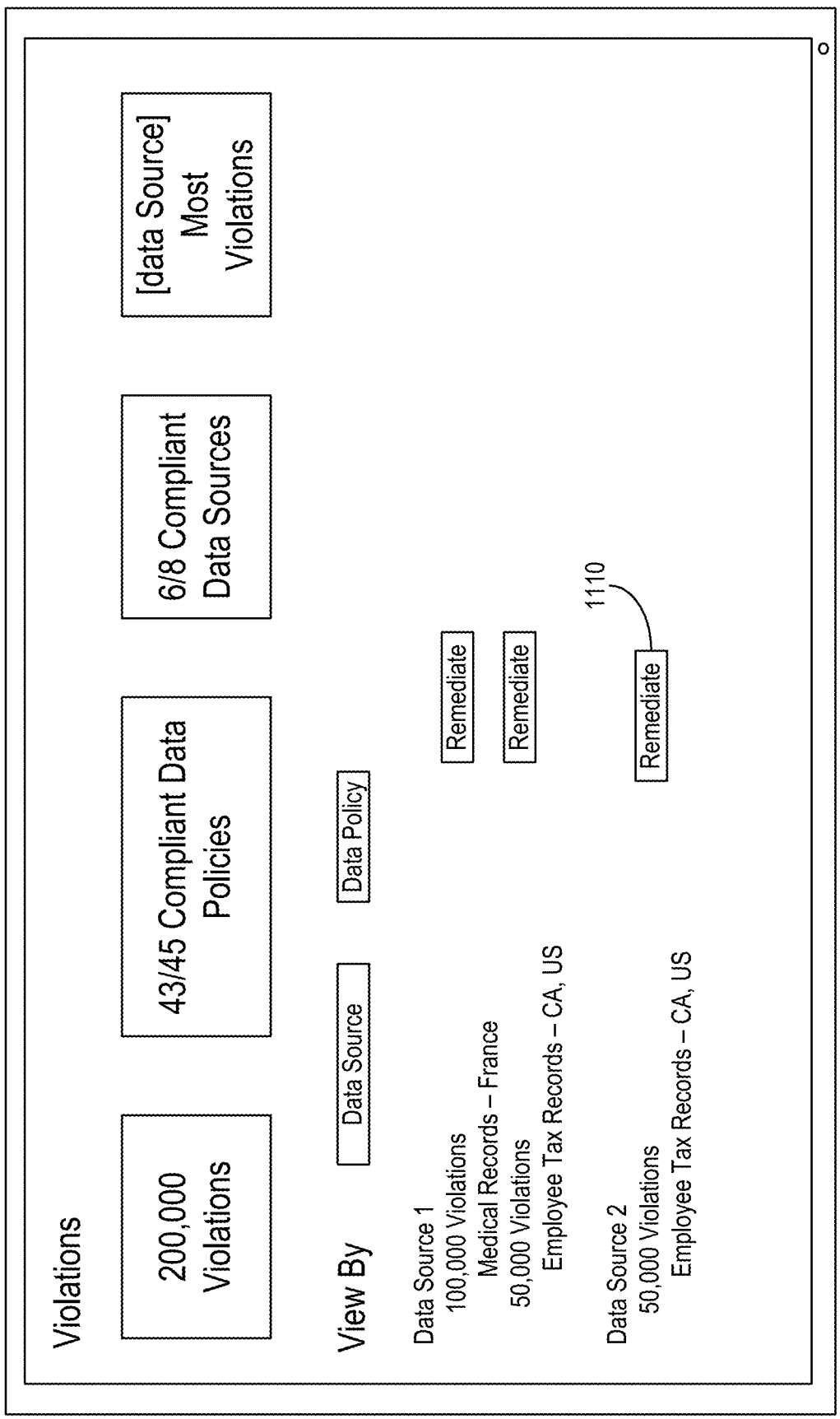
FIG. 11 illustrates an example of a graphical user interface within the client application of the client device with a listing of data retention violations organized by data source and/or data policies in accordance with some aspects.
Figure 12:
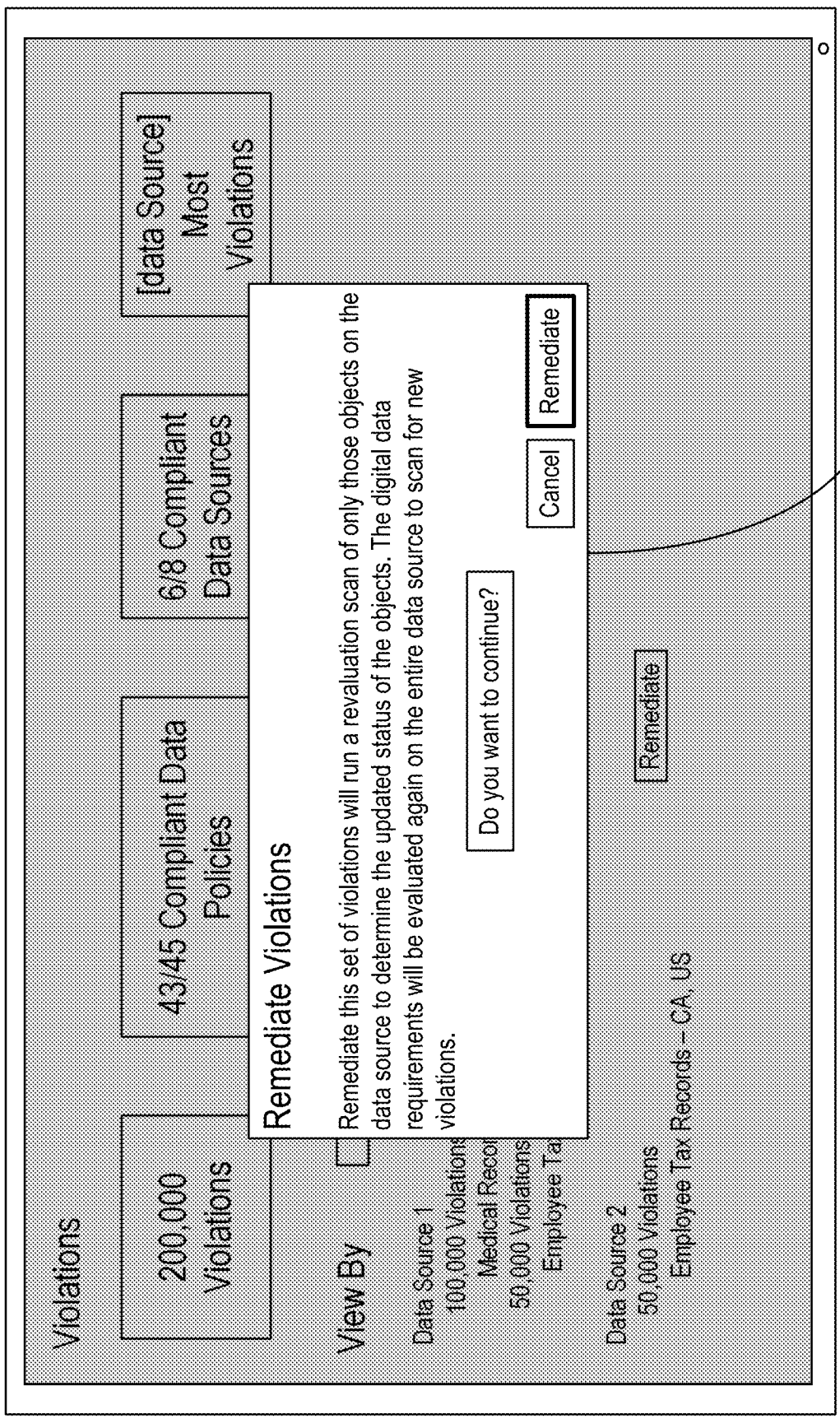
FIG. 12 illustrates an example of a graphical user interface within the client application of the client device for remediating violations in accordance with some aspects.

Furthermore, as illustrated in FIGS. 10-12, the content classification system 104 provides graphical user interfaces within the client application of the client device for remediating violations. For example, as shown in FIG. 10, the content classification system 104 can provide an individual listing of data retention violations for remediation. By utilizing the input element 1010, the client device can initiate a remediation for the selected violations. In particular, the content classification system 104 provides tools for a user to implement downstream operations to remediate selected violations through the graphical user interface in connection with managing the digital content items.

As further shown in FIG. 11, the content classification system 104 provides a listing of data retention violations organized by data source and/or data policies and provides additional relevant information regarding the violations. In addition, the content classification system 104 provides tools to resolve the displayed violations. For example, by utilizing the input element 1110, the client device can remediate the violations associated with "Data Source 2." In a similar manner, the client device can remediate the other listed violations.

Furthermore, as shown in FIG. 12, based on the selection of a remediation (e.g., input element 1110 in FIG. 11), the content classification system 104 provides feedback to the client device indicating the extent of the remediation before beginning the remediation process (e.g., in an overlay 1200). In particular, based on a selection of remediation for the violations associated with "Data Source 2," the content classification system 104 runs a revaluation scan of the digital content items associated with the violations to determine an updated status for the digital content items. Further, the content classification system 104 can revalidate the "Data Source 2" to scan for new violations (or unremediated violations).

As shown in FIG. 13, in some aspects, the client device also displays a listing of current violations (e.g., utilizing a plurality of columns related to different information associated with the violations). In particular, the client device displays a column 1302 displaying the names of issues corresponding to a violation. The client device also displays a column 1304 displaying the responsible organizations including the assignees of one or more organizations to which each violation is assigned. The client device displays a column 1306 displaying the type of issues including data access, data retention, or data usage. Additionally, the client device displays a column 1308 displaying the severity levels including low, moderate, and high. The client device displays a fifth column 1310 indicating the data sources associated with the violations. The client device displays a column 1312 including the states of each task, such as whether the task is completed or in progress (i.e., "Investigating"). Further, the client device displays a column 1314 including deadlines to complete the remediations of the associated validations. FIG. 13 also illustrates that the client device displays "Create New" element 1316, which upon selection causes the client device to provide the option to create a listing for a new violation issue to be resolved.

Figure 14:
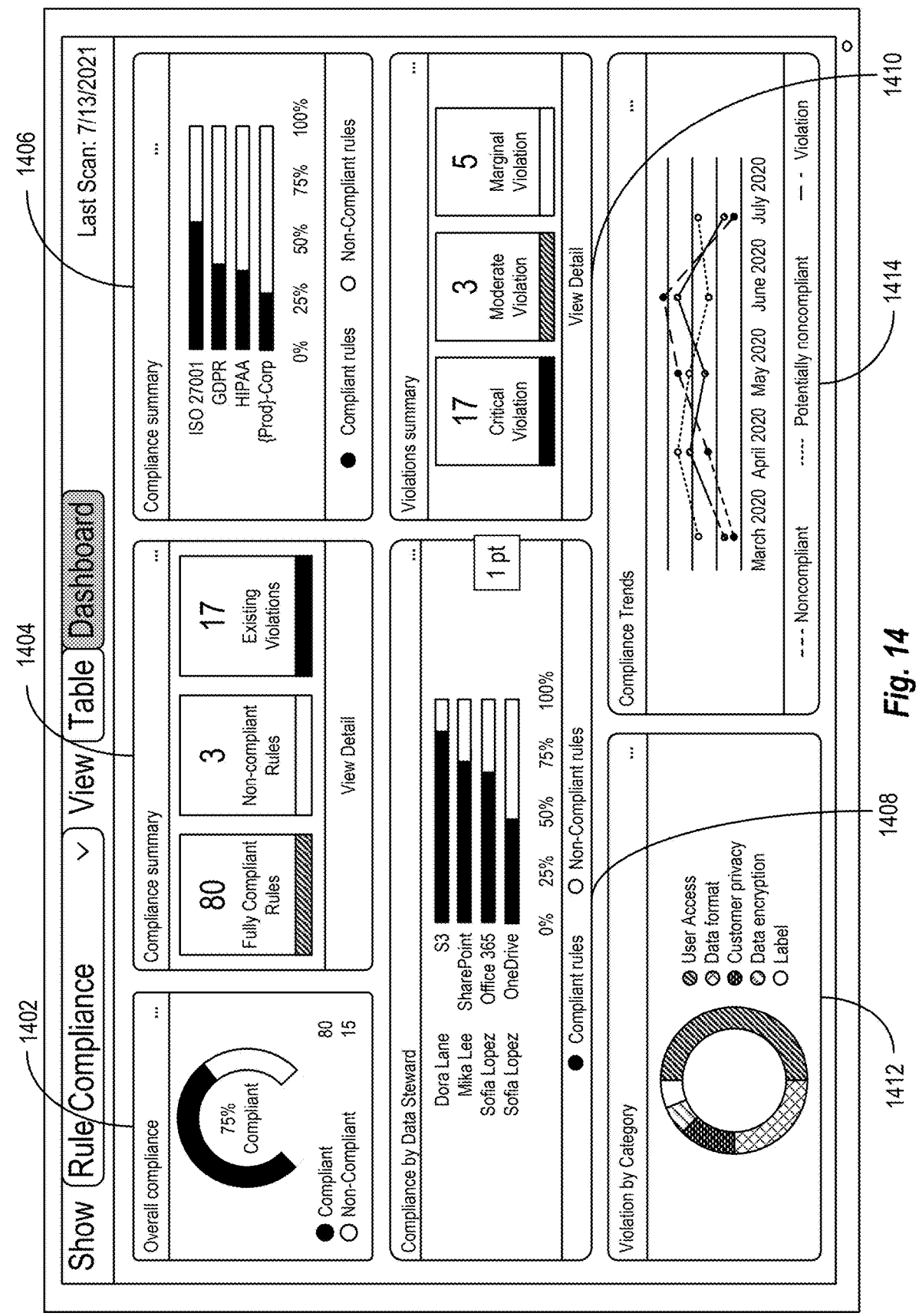
FIG. 14 illustrates an example of a graphical user interface of a client application on a client device including a summary of details associated with rule compliance in accordance with some aspects.

FIG. 14 illustrates a graphical user interface of a client application on a client device including a summary of details associated with rule compliance (e.g., for one or more data policies) for an entity. For example, as shown in FIG. 14, the client device displays an overall compliance element 1402 indicating a level of compliance of the entity according to the number of compliant rules. Additionally, a compliance summary element 1404 can include additional information such as the number of fully compliant rules, number of non-compliant rules, and number of existing violations. Furthermore, the client device displays a compliance summary 1406 for compliant rules. Additionally, as shown, the client device displays a record of compliance by data steward 1408 including details of compliant rules associated with individual users and applications. Further, the client device displays a violations summary 1410 that displays a summary of violations based on severity. In addition, the client device displays a summary of violation by category 1412 including a visual representation of violations divided into various categories. Also, the client device displays a representation of compliance trends 1414 including a representation of compliance and violations over a range of dates. Furthermore, in some aspects, based on a client device interaction, the client device also displays more detailed information associated with each of the dashboard items described based on client device interaction with the dashboard items.

Figure 15:
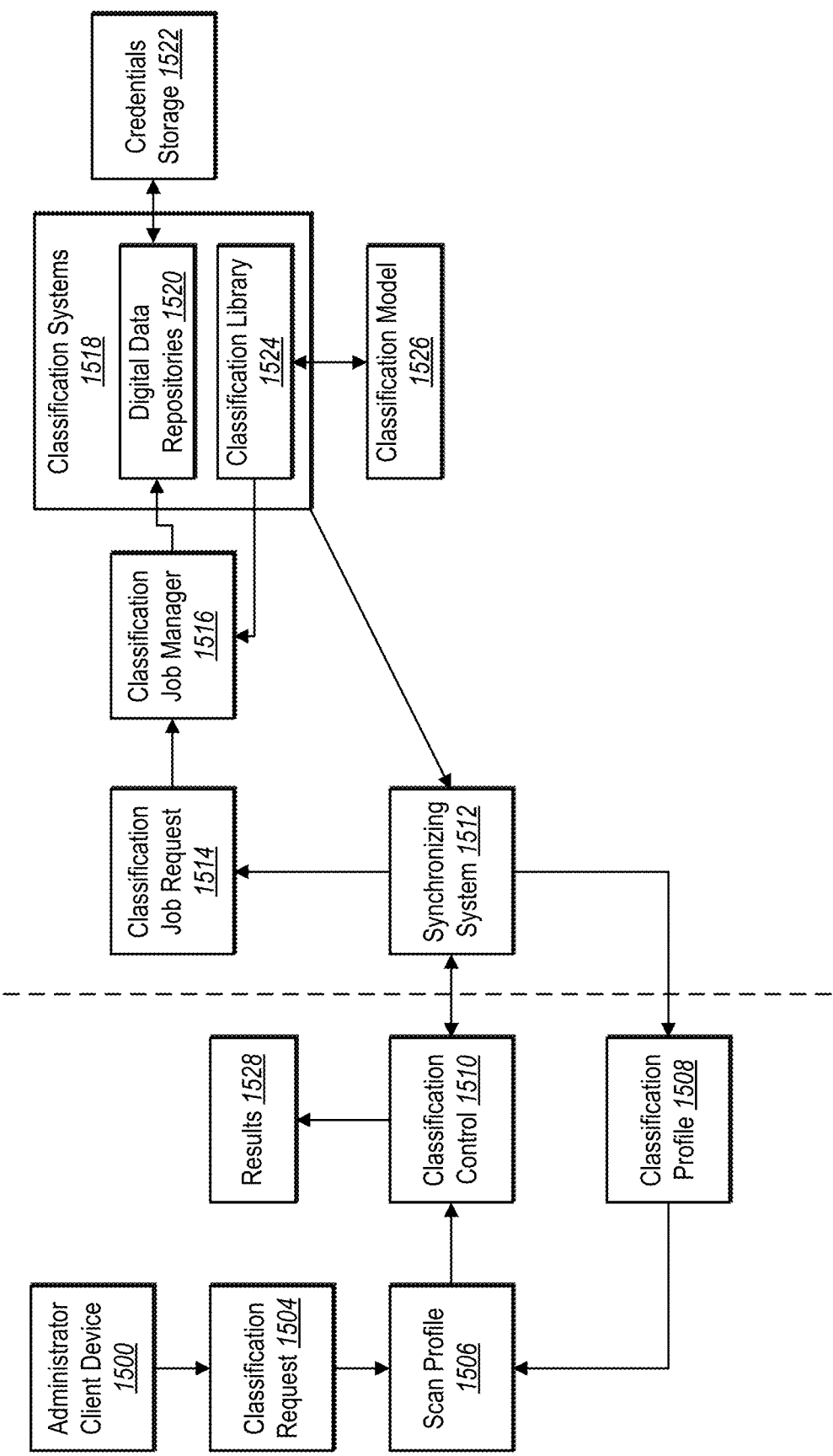
FIG. 15 illustrates an example of a system architecture of the content classification system 104 executing a classification request in accordance with some aspects.

FIG. 15 illustrates an example of a system architecture of the content classification system 104 executing a classification request in accordance with some aspects. FIG. 15 illustrates an example architecture of the content classification system 104 performing operations to classify data associated with entities. In some aspects, as illustrated, a first portion of the content classification system 104 operates at a cloud-based computing system. Additionally, a second portion of the content classification system 104 operates on premises (e.g., on one or more computing devices or servers associated with an entity, a shared processing infrastructure, or both).

In some aspects, the content classification system 104 includes or communicates with an administrator client device 1502 that initiates a classification request 1504 to classify digital content items within digital data repositories 1520.

In some aspects, the content classification system 104 determines a scan profile 1506 indicating one or more instructions for classifying the dataset according to one or more policies. Furthermore, in some aspects, the scan profile 1506 includes (or is otherwise based on) a classification profile 1508 indicating hierarchy levels for classified content from the dataset, for example, as determined by the content classification system 104 or based on hierarchy levels corresponding to downstream operations. As also illustrated, in some aspects, the content classification system 104 provides the scan profile 1506 to a classification control 1510 that initiates the classification request in connection with a portion of the content classification system 104 at computing devices of the entity.

In some aspects, an electronic request from a computing system includes a packet or message sent to the content classification system 104 (e.g., via an API provided by the content classification system 104) and including processing instructions to perform one or more operations via one or more recipient processors and/or processing threads. For instance, a classification request can include a request to extract data, modify data, or otherwise perform operations on data for one or more entities.

In additional aspects, the content classification system 104 utilizes the classification control 1510 to provide the classification request 1504 with the scan profile 1506 to a synchronizing system 1512 at computing devices of the entity. For instance, the synchronizing system 1512 can continuously poll the classification control 1510 for new classification requests. In some aspects, the synchronizing system 1512 provides the classification profile 1508 for inclusion with the scan profile 1506. As illustrated in FIG. 15, the content classification system 104 deploys the synchronizing system 1512 (with additional components) at the computing device(s) of the entity behind network security controls (e.g., outside one or more firewalls) for accessing entities (e.g., at the computing devices or via one or more remote computing devices through the firewall(s)).

For instance, in the example depicted in FIG. 1, the synchronizing system 1512 (with additional components) could be installed on the third-party computing system(s) 108 and have access to one or more digital data repositories 112 within a computing environment managed or accessed via one or more administrator client devices 110a-110n. In this example, the content classification system 104 includes the classification control 1510 and the synchronizing system 1512. The classification control 1510, installed on a server device(s) 102, can only communicate with the synchronizing system 1512, installed on the third-party computing system(s) 108, whereas the synchronizing system 1512 (with additional components) can perform various classifying and classification actions described herein.

In some aspects, the content classification system 104 utilizes the synchronizing system 1512 to compare a list of classification jobs to determine one or more actions to take. For example, in response to determining that a classification request is present on the cloud-based system but not on the on-premises system, the synchronizing system 1512 initiates a new classification job. In response to determining that a classification request is present on the on-premises system but not on the cloud-based system, the synchronizing system 1512 cancels the classification job on the on-premises system. If the synchronizing system 1512 determines that a classification request is present on both systems, the synchronizing system 1512 determines a status of the classification request (e.g., completed, failed, or timed-out) and sends a status notification to the classification control 1510.

In some aspects, the content classification system 104 utilizes the synchronizing system 1512 to submit a classification job request 1514 to a classification job manager 1516 that manages the initiation and execution of classification job requests at the computing device(s) of the entity and/or via a shared processing infrastructure. For example, the content classification system 104 utilizes the classification job manager 1516 to communicate with classification systems 1518 that scan digital data repositories 1520 including a dataset associated with the classification job request 1514 by leveraging the parallel processing and publishing infrastructure of the shared processing infrastructure. In additional aspects, the classification systems 1518 include functions, scripts, or applications integrated with the digital data repositories 1520 to access and/or modify entities in the dataset. To illustrate, the classification systems 1518 communicate with a database management system, a cloud storage devices or local storage devices, and/or storage accounts (e.g., utilizing credentials in a credentials storage 1522) to access entities. In some aspects, a listing of classification jobs received from the classification control 1510 can include job contexts for each classification job request.

In one or more embodiments, the content classification system 104 executes a classification job through a pipeline of initiation, distribution, extraction and classification implemented by the classification systems 1518 on the on-premises system, in which various events are emitted at different stages. Events can include examples such as those in the table below:

| |
|---|
| JOB_DISTRIBUTION_STARTED |
| JOB_CANCELLED |
| INCREMENT_JOB_SIZE |
| JOB_DISTRIBUTION_COMPLETED |
| JOB_DISTRIBUTION_FAILED |
| TASK_STARTED |
| UPDATE_TASK_SIZE |
| INCREMENT_PROCESSED_SIZE |
| TASK_COMPLETED |
| TASK_FAILED |
| TASK_CANCELLED |

The classification job manager 1516 can subscribe to the events and manage the lifecycle of the jobs/tasks based on those events. Additionally, classification systems 1518 can emit events upon completion of a particular phase of the classification job in a pipeline. In some aspects, the classification job manager 1516 updates a jobs repository to indicate which of these events have been emitted for a given classification job.

Furthermore, as illustrated, the classification systems 1518 include a classification library 1524 that communicates with a classification model 1526 (e.g., a named entity recognition model or other natural language processing model) to determine classifications associated with the entities. In some aspects, a classification model 1526 can be implemented using one or more classification features described above with respect to FIGS. 2-5.

According to some aspects, in response to executing the classification job request 1514 utilizing the classification systems 1518, the content classification system 104 utilizes the classification systems 1518 to communicate results data to the synchronizing system 1512. For example, the classification systems 1518 can provide classification results corresponding to the digital content items indicated in the classification job request 1514 to the synchronizing system 1512. Additionally, as illustrated, the synchronizing system 1512 can provide the classification results to the classification control 1510, which provides the results 1528 for display and analysis via one or more client devices (e.g., the administrator client device 1502).

In some aspects, the content classification system 104 provides the results 1528 in connection with one or more downstream operations. The downstream operations can involve one or more computing devices (e.g., the administrator client device 1502 or another device/system) performing operations to classify specific data types within the digital data repositories 1520, manage data from the digital data repositories 1520 via automated workflows, control access to data within the digital data repositories 1520, and/or facilitate deletion of data from the digital data repositories 1520. To illustrate, the content classification system 104 can detect a new type/classification of digital content items (e.g., personal data or sensitive data) stored in a particular data source, which triggers an automated workflow via a software platform that includes or has access to the digital data repositories 1520. The automated workflow can include a series of user interfaces that are dynamically selected, generated, organized, or otherwise configured based on the classification workflow.

An example of the workflow includes the classification and assessment of digital content items (e.g., via one or more software modules of the platform) in which a series of user interfaces for classifying information (e.g., information regarding one or more of the data sources, the discovered data, the use of the discovered data, etc.) are displayed to a user. The content classification system 104 (or another system) can dynamically categorize content items for display on a series of interfaces based on the digital content item classifications (e.g., selecting interfaces presenting violations related to privacy issues for certain digital content items) and the data received via various interfaces in the workflow (e.g., providing options to resolve or revalidate digital content items).

In some aspects, the content classification system 104 (or another system) can dynamically identify violations associated with categorized digital content items. Furthermore, the system may utilize the automated workflow to notify appropriate users of the violations, implement appropriate steps to remediate violations, or monitor the categorized digital content items for potential security/privacy risks. Accordingly, the content classification system 104 can execute an violation assessment in response to one or more user inputs or automatically in response to detecting a classification in a particular source and execute an automated workflow to perform one or more computing operations based on the assessment and/or otherwise in connection with detecting the classification.

Additionally, or alternatively, the content classification system 104 determines classifications for digital content items stored in one or more data sources and uses the determined classifications to implement purpose-based data processes. For instance, the content classification system 104 can determine that data processes for certain data (e.g., web form data) may be subject to a particular purpose for managing the data. To illustrate, a storage computing system may manage credit card data or other financial data stored on the storage computing system to use in processing a purchase for a first data subject via a website. In such an example, the credit card data (e.g., entire credit card number and security code) may not necessarily be stored for security purpose and a portion of the credit card data may be stored. Therefore, the storage computing system may determine specific data processes for the credit card data based on the different purposes associated with the storage requirements for the credit card data. Such data processes may not only be applicable with respect to the entity requesting access to the data, but may also be applicable to how the data is displayed (e.g., modified) or used once accessed by the entity.

Indeed, improved methods for classifying data contained in a storage system (i.e., determining that data source X includes credit card data) by the content classification system 104 facilitates the application of data processes (e.g., which implement certain purpose restrictions) that selectively manage datasets so that the datasets are compliant with the purpose restrictions implemented via the data processes. For instance, a user of the computing environment that includes the data sources may have an account with a certain role that is assigned certain permissions. The permissions may allow access to certain types of data in certain types of data source for certain purposes associated with the role. Thus, the content classification system 104 facilitates purpose-based access data processes for data based on the classification applied to the data. This ensures that the personal data is only accessed by authorized users (e.g., user accounts) for authorized purposes.

Additionally or alternatively, the content classification system 104 assists in the automated detection and remediation of data retention policies. For example, the content classification system 104 detects a certain type of data stored in a data source, such as personal data or other data considered sensitive for legal, regulatory, or policy reasons. The content classification system 104 also detects one or more dates associated with the data (e.g., data of a document's creation, date contained within a document, etc.). The combination of the determined type of data plus other criteria, such as the date, indicates that retention of the data constitutes a policy violation, such as a data retention policy. A software program or suite that includes the content classification system 104 or that communicates with the content classification system 104 (e.g., via an integration between the software program and the content classification system 104) can automatically delete (or automatically prompt a user to delete) the data that violates the policy.

For example, the content classification system 104 may determine that a data source contains personal data that was created more than 7 years ago. A software program that has access to the content classification system 104 (e.g., via an integration between the software program and a SaaS platform hosting the content classification system 104) may cause the third-party system to automatically delete the personal data, as it is no longer required to be retained under the organization's data retention policy. The automatic deletion may be automated (e.g., without requiring any user intervention) via the content classification system 104 or partially automated (e.g., by presenting a user with a prompt or screen identifying the data to be deleted and proceeding with the deletion upon receiving the user's confirmation).

Although FIG. 15 illustrates that the content classification system 104 utilizes a plurality of components within a cloud-based system and a plurality of components at on premises devices of a single entity device, the content classification system 104 can implement data classification for a plurality of entity devices. To illustrate, the content classification system 104 can integrate separate synchronizing systems, classification request managers, and classifying systems at computing devices of each entity device that issues a classification request to the components within the cloud-based system. For instance, the content classification system 104 can utilize the classification control 1510 to manage classifying requests for a plurality of entity devices and communicate with a plurality of separate synchronizing systems at different computing devices of the different entity devices.

Additionally, as mentioned above, the content classification system 104 can utilize a first set of operations to manage a scan profile 1506 and a classification control 1510 for implementing a classification request 1504 and providing results 1528 of the classification request 1504 via the administrator client device 1502 at a first computing system (e.g., a cloud-based computing system) while communicating with a shared processing infrastructure. Additionally, the content classification system 104 can utilize a second set of operations to manage a synchronizing system 1512, a classification job manager 1516, and classification systems 1518 to classify data in digital data repositories 1520 and classify the data utilizing a classification model 1526 at a second computing system (e.g., one or more computing devices or servers at one or more locations of an entity) while communicating with the shared processing infrastructure.

In some aspects, the content classification system 104 utilizes one or more other configurations, such that one or more portions described above in connection with the first computing system are instead part of the second computing system, or vice-versa. Thus, the content classification system 104 can utilize several different computing devices (e.g., cloud-based devices or on premises devices) to perform various operations associated with classifying and routing digital content items. In additional aspects, the content classification system 104 performs one or more operations described herein by utilizing one or more software applications at one or more computing devices to generate instructions that cause one or more additional computing devices to perform one or more computing operations. As an example, a cloud-based computing application classifies a digital content item by generating instructions that cause a server on premises of an organizational entity to utilize a classification model to generate a classification for entities.

In some aspects, the components deployed on the computing device(s) of the entity are part of a discovery agent for detecting data sources, datasets, and data types via data extraction and classification. The content classification system 104 can utilize the discovery agent to identify a data source, scan the data source, tag the data source (e.g., tag data in the data source), and send and classify the respective set of data in accordance with the tagged data. In some instances, by utilizing the discovery agent, the content classification system 104 generates metadata associated with entities to indicate results of the identification and classification by the discovery agent. Additionally, the discovery agent can include one or more virtual machines for storing data and/or including/executing identification operations or classifying operations.

Figure 16:
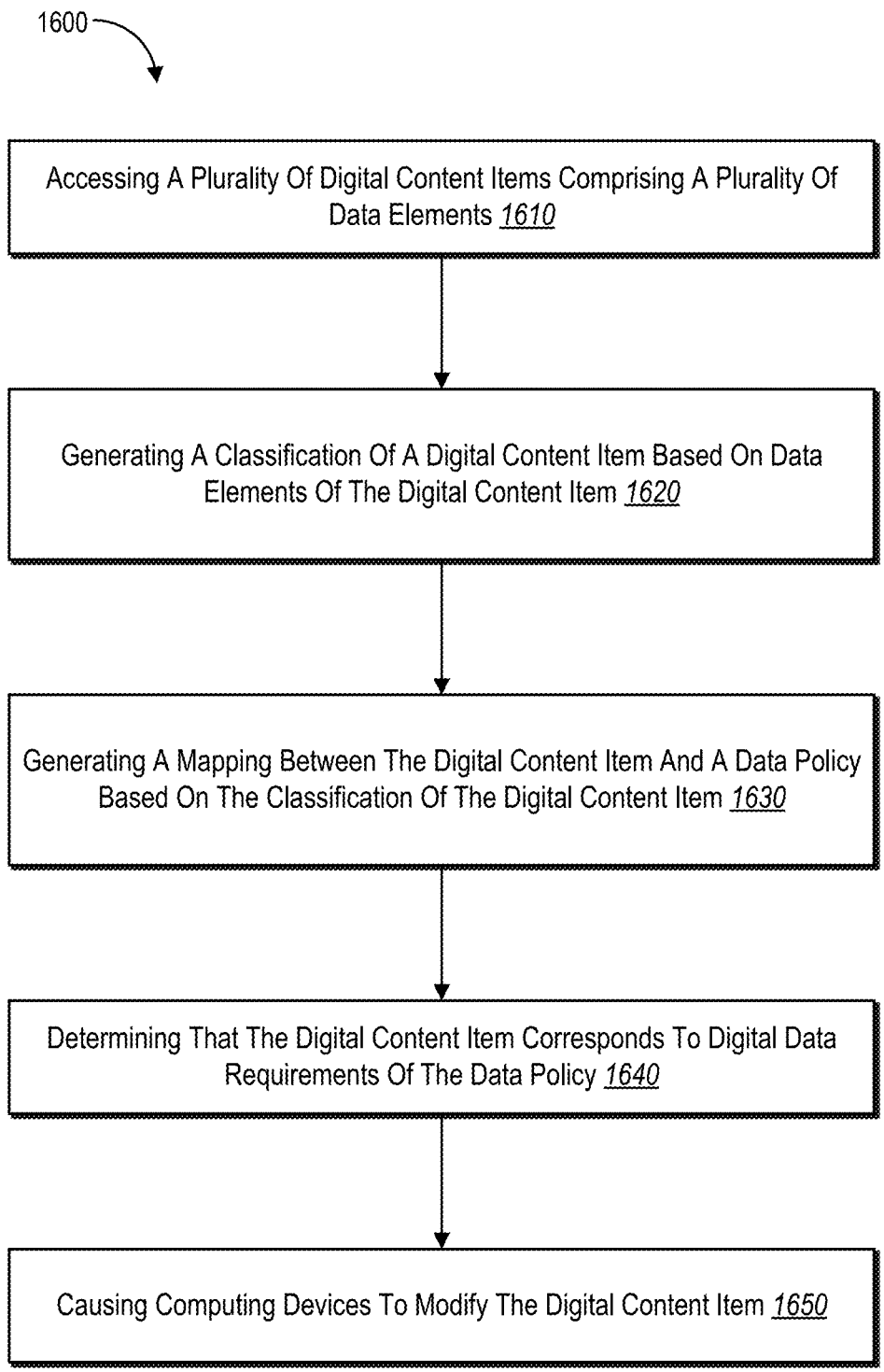
FIG. 16 illustrates an example flowchart of a process for classifying and modifying a digital content item according to the digital data requirements of a data policy in accordance with some aspects.

In additional aspects, the content classification system 104 configures the discovery agent to reduce an impact on a performance of the computing devices, servers, etc. For instance, the content classification system 104 can configure the discovery agent to utilize bandwidth throttling techniques, such as by limiting classifying and other processing steps to non-peak times. The content classification system 104 can also configure the discovery agent to limit performance of such operations to backup applications and data storage locations (e.g., by using sampling techniques to decrease a number of files to scan during the data discovery process). Turning now to FIG. 16, this figure illustrates an example flowchart of a process for classifying and modifying a digital content item according to the digital data requirements of a data policy in accordance with some aspects. While FIG. 16 illustrates acts according to one aspect, alternative aspects may omit, add to, reorder, and/or modify any of the acts shown in FIG. 16. The acts of FIG. 16 can be performed as part of a method. Alternatively, a non-transitory computer readable medium can comprise instructions, that when executed by one or more processors, cause a computing device to perform the acts of FIG. 16. In still further aspects, a system can perform the acts of FIG. 16.

As shown, the process 1600 includes an act 1610 of accessing a plurality of digital content items comprising a plurality of data elements. In particular, the act 1610 can include accessing, by processing hardware via an integration with a third-party computing system, a plurality of digital content items comprising a plurality of data elements. In some aspects, act 1610 is implemented using one or more examples described above with respect to FIGS. 3-5, and 15.

Furthermore, the process 1600 includes an act 1620 of generating a classification of a digital content item of the plurality of digital content items based on data elements of the digital content item. In particular the act 1620 can include generating, by the processing hardware utilizing a classifier model, a classification of a digital content item of the plurality of digital content items based on data elements of the digital content item. In some aspects, act 1620 is implemented using one or more examples described above with respect to FIGS. 2-5.

Moreover, the process 1600 includes an act 1630 of generating a mapping between the digital content item and a data policy based on the classification of the digital content item. In particular the act 1630 can include generating, by the processing hardware, a mapping between the digital content item and a data policy based on the classification of the digital content item. In some aspects, act 1630 is implemented using one or more examples described above with respect to FIGS. 2-5.

Further, the process 1600 includes an act 1640 of determining that the digital content item corresponds to digital data requirements of a data policy. In particular the act 1640 can include determining, by the processing hardware and based on the mapping and attributes of the digital content item, that the digital content item violates the data according to one or more digital data requirements of the data policy. In some aspects, act 1640 is implemented using one or more examples described above with respect to FIGS. 4, 5, and 8-12.

Additionally, the process 1600 includes an act 1650 of causing computing devices to modify the digital content item. In particular, the act 1650 can include causing, by the processing hardware, one or more computing devices to modify the digital content item according to the digital data requirements of the data policy. In some aspects, act 1650 is implemented using one or more examples described above with respect to FIGS. 2-5, 9, 11, and 12.

In some aspects, the process 1600 includes determining data object cluster members comprising mappings of a subset of digital content items of the plurality of digital content items, the subset of digital content items comprising data elements that meet a similarity threshold. The process 1600 can also include generating a data object cluster comprising the data object cluster members. The process 1600 can further include mapping the digital content item to the data object cluster according to the classification of the digital content item. Additionally, the process 1600 can include generating, by the processing hardware utilizing a classifier model, a classification of an additional digital content item of the plurality of digital content items based on data elements of the additional digital content item. Further, the process 1600 can include mapping the additional digital content item to the data object cluster according to the classification of the additional content item.

The process 1600 can also include determining, by the processing hardware and based on attributes of the data object cluster, that the digital content item violates the data policy according to the one or more digital data requirements of the data policy. The process 1600 can further include causing, by the processing hardware, one or more computing devices to modify the digital content item and the additional digital content item according to the digital data requirements of the data policy. The process 1600 can also include comparing, in response to the digital content item mapping to the data object cluster, the attributes of the digital content item and the attributes of the additional digital content item to a threshold indicated by the one or more digital data requirements. Further, the process 1600 can include determining that the attributes of the digital content item meet the threshold indicated by the one or more digital data requirements. In addition, the process 1600 can include determining that the attributes of the additional digital content item do not meet the threshold indicated by the one or more digital data requirements. Furthermore, the process 1600 can include causing the one or more computing devices to modify the digital content item in response to the attributes of the digital content item meeting the threshold indicated by the one or more digital data requirements.

The process 1600 can also include determining a classification hierarchy comprising a plurality of levels. In addition, the process 1600 can include generating the classification of the digital content item comprising a first level of the classification hierarchy. Further, the process 1600 can include generating an additional classification of the digital content item comprising a second level of the classification hierarchy that is above the first level of the classification hierarchy in the classification hierarchy. In addition, the process 1600 can include generating, by the processing hardware for display via a graphical user interface of a computing device associated with the third-party computing system, an indication of the modification to the digital content item. Additionally, the process 1600 can include verifying, by the processing hardware, that the data elements of the modified digital content item do not meet a threshold indicated by the one or more digital data requirements of the data policy.

The process 1600 can also include causing the one or more computing devices to remove the digital content item from the third-party computing system. In some aspects, the process 1600 can include comparing, in response to the classification of the digital content item, the attributes of the digital content item to a threshold indicated by the one or more digital data requirements. In addition, the process 1600 can include determining that the attributes of the digital content item meet the threshold indicated by the one or more digital data requirements. Furthermore, the process 1600 includes causing the one or more computing devices to modify the digital content item in response to the attributes of the digital content item meeting the threshold indicated by the one or more digital data requirements.

Additionally, the process 1600 includes accessing, by integration with a third-party computing system, a plurality of digital content items comprising a plurality of data elements. In addition, the process 1500 can include generating a mapping between the digital content item and a data policy based on the classification of the digital content item. In addition, the process can include determining, based on the mapping and attributes of the digital content item, that the digital content item meets a threshold indicated by one or more digital data requirements of a data policy. In addition, the process 1600 can include generating a request for one or more computing devices to modify the digital content item according to the digital data requirements of the data policy. In addition, the process 1600 can include determining the digital content item was modified by the one or more computing devices according to the digital data requirements of the data policy.

The process 1600 can also include determining a subset of digital content items comprising data elements that meet a similarity threshold. In addition, the process 1600 can include generating a data object cluster comprising mappings of the subset of digital content items to the data policy. Further, the process 1600 can include mapping the digital content item to the data object cluster based on the classification of the digital content item. In addition, the process 1600 can include generating, utilizing a classifier model, a classification of an additional digital content item of the plurality of digital content items based on data elements of the additional digital content item. Further, the process 1600 can include mapping the additional digital content item to the data object cluster according to the classification of the additional digital content item.

The process 1600 can also include determining, by monitoring attributes of the subset of digital content items in the data object cluster, that the digital content item and the additional digital content item violate the data policy according to the one or more digital data requirements of the data policy. In addition, the process 1600 can include causing, one or more computing devices to modify the digital content item and the additional digital content item according to the one or more digital data requirements of the data policy.

Further, the process 1600 can include comparing, in response to the digital content item and the additional digital content item mapping to the data object cluster, the attributes of the digital content item and the attributes of the additional digital content item to a threshold indicated by the one or more digital data requirements. In addition, the process 1600 can include determining that the digital content item violates the data policy in response to determining that attributes of the digital content item meet the threshold indicated by the one or more digital data requirements. Further, the process 1600 can include determining that the additional digital content item does not violate the data policy in response to determining that the attributes of the additional digital content item do not meet the threshold indicated by the one or more digital data requirements. In addition, the process 1600 can include causing the one or more computing devices to modify the digital content item in response to determining that the digital content item violates the data policy.

In addition, the process 1600 can include determining a classification hierarchy comprising a plurality of levels. Further, the process 1600 can include generating, based on a data element of the digital content item, the classification of the digital content item comprising a first level of the classification hierarchy. In addition, the process 1600 can include generating, based on a combination of data elements of the digital content item, an additional classification of the digital content item comprising a second level of the classification hierarchy that is above the first level of the classification hierarchy in the classification hierarchy. Further, the process 1600 can include generating, for display via a graphical user interface of a computing device associated with the third-party computing system, an indication of the modified digital content item.

Additionally, the process 1600 can include generating a classification of a digital content item of a plurality of digital content items associated with an entity based on data elements of the digital content item. Further, the process 1600 can include generating a mapping between the digital content item and a data policy based on the classification of the digital content item. In addition, the process 1600 can include determining, based on the mapping and attributes of the digital content item, that the digital content item corresponds to one or more digital data requirements of the data policy. Moreover, the process 1600 can include causing one or more computing devices to modify the digital content item according to the one or more digital data requirements of the data policy. Additionally, the process 1600 can include determining data object cluster members comprising mappings of a subset of digital content items of the plurality of digital content items, the subset of digital content items comprising data elements that meet a similarity threshold.

In addition, the process 1600 can include generating a data object cluster comprising the data object cluster members. Further, the process 1600 can include mapping the digital content item to the data object cluster in response to determining that the classification of the digital content item matches a classification associated with the data object cluster. Moreover, the process 1600 can include generating, utilizing a classifier model, a classification of an additional digital content item of the plurality of digital content items based on data elements of the additional digital content item. Further, the process 1600 can include mapping the additional digital content item to the data object cluster according to the classification of the additional digital content item. In addition, the process 1600 can include determining, based on attributes of the subset of digital content items in the data object cluster, that the digital content item and the additional digital content item violate the data policy according to the one or more digital data requirements of the data policy. Moreover, the process 1600 can include causing one or more computing devices to modify the digital content item and the additional digital content item according to the one or more digital data requirements of the data policy.

Aspects of the present disclosure may comprise or utilize a special purpose or general-purpose computer including computer hardware, such as, for example, one or more processors and system memory, as discussed in greater detail below. Aspects within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, aspects of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some aspects, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Aspects of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 17:
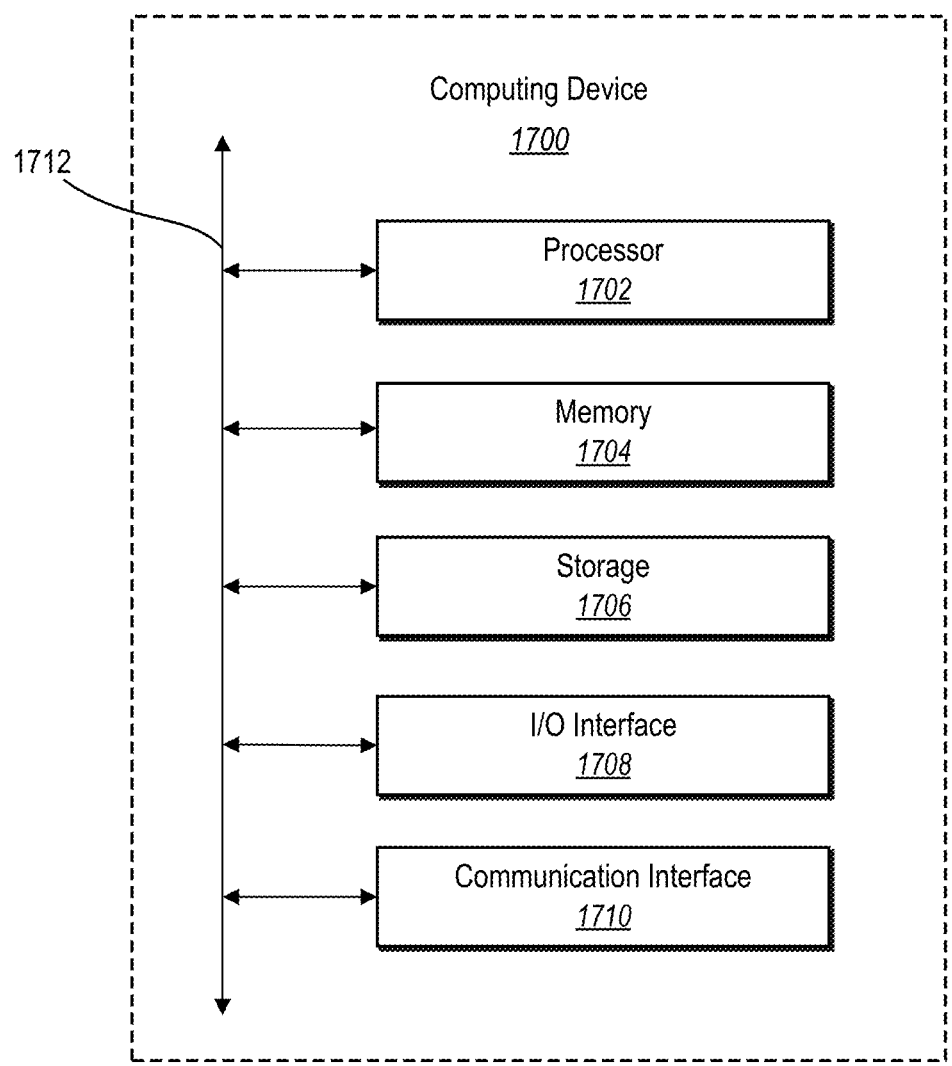
FIG. 17 illustrates an example of a computing device in accordance with some aspects.

FIG. 17 illustrates a block diagram of exemplary computing device 1700 that may be configured to perform one or more of the processes described above. One will appreciate that one or more computing devices such as the computing device 1700 may implement the system(s) of FIG. 1. As shown by FIG. 17, the computing device 1700 can comprise a processor 1702, a memory 1704, a storage device 1706, an I/O interface 1708, and a communication interface 1710, which may be communicatively coupled by way of a communication infrastructure 1712. In certain aspects, the computing device 1700 can include fewer or more components than those shown in FIG. 17. Components of the computing device 1700 shown in FIG. 17 will now be described in additional detail.

In some aspects, the processor 1702 includes hardware for executing instructions, such as those making up a computer program. As an example, and not by way of limitation, to execute instructions for dynamically modifying workflows, the processor 1702 may retrieve (or fetch) the instructions from an internal register, an internal cache, the memory 1704, or the storage device 1706 and decode and execute them. The memory 1704 may be a volatile or non-volatile memory used for storing data, metadata, and programs for execution by the processor(s). The storage device 1706 includes storage, such as a hard disk, flash disk drive, or other digital storage device, for storing data or instructions for performing the methods described herein.

The I/O interface 1708 allows a user to provide input to, receive output from, and otherwise transfer data to and receive data from computing device 1700. The I/O interface 1708 may include a mouse, a keypad or a keyboard, a touch screen, a camera, an optical scanner, network interface, modem, other known I/O devices or a combination of such I/O interfaces. The I/O interface 1708 may include one or more devices for presenting output to a user, including, but not limited to, a graphics engine, a display (e.g., a display screen), one or more output drivers (e.g., display drivers), one or more audio speakers, and one or more audio drivers. In certain aspects, the I/O interface 1708 is configured to provide graphical data to a display for presentation to a user. The graphical data may be representative of one or more graphical user interfaces and/or any other graphical content as may serve a particular implementation.

The communication interface 1710 can include hardware, software, or both. In any event, the communication interface 1710 can provide one or more interfaces for communication (such as, for example, packet-based communication) between the computing device 1700 and one or more other computing devices or networks. As an example, and not by way of limitation, the communication interface 1710 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1710 may facilitate communications with various types of wired or wireless networks. The communication interface 1710 may also facilitate communications using various communication protocols. The communication infrastructure 1712 may also include hardware, software, or both that couples components of the computing device 1700 to each other. For example, the communication interface 1710 may use one or more networks and/or protocols to enable a plurality of computing devices connected by a particular infrastructure to communicate with each other to perform some aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary aspects thereof. Various aspects and aspects of the present disclosure (s) are described with reference to details discussed herein, and the accompanying drawings illustrate the various aspects. The description above and drawings are illustrative of the disclosure and are not to be construed as limiting the disclosure. Numerous specific details are described to provide a thorough understanding of various aspects of the present disclosure.

The present disclosure may be embodied in other specific forms without departing from its spirit or essential characteristics. The described aspects are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
accessing, by processing hardware via an integration with a third-party computing system, a plurality of digital content items comprising a plurality of data elements;
generating, by the processing hardware utilizing a classifier model, a classification of a digital content item of the plurality of digital content items based on data elements of the digital content item;
generating, by the processing hardware, a mapping between the digital content item and a data policy based on the classification of the digital content item;
determining, by the processing hardware and based on the mapping and attributes of the digital content item, that the digital content item violates the data policy according to one or more digital data requirements of the data policy; and
causing, by the processing hardware, one or more computing devices to modify the digital content item according to the one or more digital data requirements of the data policy.

2. The method of claim 1, further comprising:
determining data object cluster members comprising mappings of a subset of digital content items of the plurality of digital content items, the subset of digital content items comprising data elements that meet a similarity threshold;
generating a data object cluster comprising the data object cluster members; and
mapping the digital content item to the data object cluster according to the classification of the digital content item.

3. The method of claim 2, further comprising:
generating, by the processing hardware utilizing the classifier model, a classification of an additional digital content item of the plurality of digital content items based on data elements of the additional digital content item; and
mapping the additional digital content item to the data object cluster according to the classification of the additional digital content item.

4. The method of claim 3, further comprising:
determining, by the processing hardware and based on attributes of the data object cluster, that the digital content item violates the data policy according to the one or more digital data requirements of the data policy; and
causing, by the processing hardware, the one or more computing devices to modify the digital content item and the additional digital content item according to the one or more digital data requirements of the data policy.

5. The method of claim 3, further comprising:
comparing, in response to the digital content item and the additional digital content item mapping to the data object cluster, the attributes of the digital content item and the attributes of the additional digital content item to a threshold indicated by the one or more digital data requirements;
determining that the attributes of the digital content item meet the threshold indicated by the one or more digital data requirements;
determining that the attributes of the additional digital content item do not meet the threshold indicated by the one or more digital data requirements; and
causing the one or more computing devices to modify the digital content item in response to the attributes of the digital content item meeting the threshold indicated by the one or more digital data requirements.

6. The method of claim 1, further comprising:
determining a classification hierarchy comprising a plurality of levels;
generating the classification of the digital content item comprising a first level of the classification hierarchy; and
generating an additional classification of the digital content item comprising a second level of the classification hierarchy that is above the first level of the classification hierarchy in the classification hierarchy.

7. The method of claim 1, further comprising generating, by the processing hardware for display via a graphical user interface of a computing device associated with the third-party computing system, an indication of the modified digital content item.

8. The method of claim 1, further comprising verifying, by the processing hardware, that the data elements of the modified digital content item do not meet a threshold indicated by the one or more digital data requirements of the data policy.

9. The method of claim 1, wherein causing the one or more computing devices to modify the digital content item comprises causing the one or more computing devices to remove the digital content item from the third-party computing system.

10. The method of claim 1, further comprising:
comparing, in response to the classification of the digital content item, the attributes of the digital content item to a threshold indicated by the one or more digital data requirements;
determining that the attributes of the digital content item meet the threshold indicated by the one or more digital data requirements; and
causing the one or more computing devices to modify the digital content item in response to the attributes of the digital content item meeting the threshold indicated by the one or more digital data requirements.

11. A system comprising:
one or more non-transitory computer readable media comprising a digital data repository; and
at least one computer processor configured to cause the system to:
access, by integration with a third-party computing system, a plurality of digital content items comprising a plurality of data elements;
generate a classification of a digital content item of the plurality of digital content items based on data elements of the digital content item;
generate a mapping between the digital content item and a data policy based on the classification of the digital content item;
determine, based on the mapping and attributes of the digital content item, that the digital content item meets a threshold indicated by one or more digital data requirements of the data policy;
generate a request for one or more computing devices to modify the digital content item according to the one or more digital data requirements of the data policy; and
determine the digital content item was modified by the one or more computing devices according to the one or more digital data requirements of the data policy.

12. The system of claim 11, wherein the at least one computer processor is further configured to cause the system to:
- determine a subset of digital content items comprising data elements that meet a similarity threshold;
- generate a data object cluster comprising mappings of the subset of digital content items to the data policy; and
- map the digital content item to the data object cluster based on the classification of the digital content item.

13. The system of claim 12, wherein the at least one computer processor is further configured to cause the system to:
- generate, utilizing a classifier model, a classification of an additional digital content item of the plurality of digital content items based on data elements of the additional digital content item; and
- map the additional digital content item to the data object cluster according to the classification of the additional digital content item.

14. The system of claim 13, wherein the at least one computer processor is further configured to cause the system to:
- determine, by monitoring attributes of the subset of digital content items in the data object cluster, that the digital content item and the additional digital content item violate the data policy according to the one or more digital data requirements of the data policy; and
- cause the one or more computing devices to modify the digital content item and the additional digital content item according to the one or more digital data requirements of the data policy.

15. The system of claim 13, wherein the at least one computer processor is further configured to cause the system to:
- compare, in response to the digital content item and the additional digital content item mapping to the data object cluster, the attributes of the digital content item and the attributes of the additional digital content item to the threshold indicated by the one or more digital data requirements;
- determine that the digital content item violates the data policy in response to determining that attributes of the digital content item meet the threshold indicated by the one or more digital data requirements;
- determine that the additional digital content item does not violate the data policy in response to determining that the attributes of the additional digital content item do not meet the threshold indicated by the one or more digital data requirements; and
- cause the one or more computing devices to modify the digital content item in response to determining that the digital content item violates the data policy.

16. The system of claim 11, wherein the at least one computer processor is further configured to cause the system to:
- determine a classification hierarchy comprising a plurality of levels;
- generate, based on a data element of the digital content item, the classification of the digital content item comprising a first level of the classification hierarchy; and
- generate, based on a combination of data elements of the digital content item, an additional classification of the digital content item comprising a second level of the classification hierarchy that is above the first level of the classification hierarchy in the classification hierarchy.

17. The system of claim 11, further comprising generating, for display via a graphical user interface of a computing device associated with the third-party computing system, an indication of the modified digital content item.

18. A non-transitory computer readable medium comprising instructions that, when executed by at least one computer processor, cause the at least one computer processor to:
- generate a classification of a digital content item of a plurality of digital content items associated with an entity based on data elements of the digital content item;
- generate a mapping between the digital content item and a data policy based on the classification of the digital content item;
- determine, based on the mapping and attributes of the digital content item, that the digital content item corresponds to one or more digital data requirements of the data policy; and
- cause one or more computing devices to modify the digital content item according to the one or more digital data requirements of the data policy.

19. The non-transitory computer readable medium of claim 18, wherein the instructions, when executed by the at least one computer processor, further cause the at least one computer processor to:
- determine data object cluster members comprising mappings of a subset of digital content items of the plurality of digital content items, the subset of digital content items comprising data elements that meet a similarity threshold;
- generate a data object cluster comprising the data object cluster members; and
- map the digital content item to the data object cluster in response to determining that the classification of the digital content item matches a classification associated with the data object cluster.

20. The non-transitory computer readable medium of claim 19, wherein the instructions, when executed by the at least one computer processor, further cause the at least one computer processor to:
- generate, utilizing a classifier model, a classification of an additional digital content item of the plurality of digital content items based on data elements of the additional digital content item;
- mapping the additional digital content item to the data object cluster according to the classification of the additional digital content item;
- determine, based on attributes of the subset of digital content items in the data object cluster, that the digital content item and the additional digital content item violate the data policy according to the one or more digital data requirements of the data policy; and
- cause the one or more computing devices to modify the digital content item and the additional digital content item according to the one or more digital data requirements of the data policy.

* * * * *